US010678950B2

(12) United States Patent
Bush et al.

(10) Patent No.: US 10,678,950 B2
(45) Date of Patent: Jun. 9, 2020

(54) AUTHENTICATED BACKPLANE ACCESS

(71) Applicant: Rockwell Automation Technologies, Inc., Mayfield Heights, OH (US)

(72) Inventors: Michael A. Bush, Hudson, OH (US); Taryl J. Jasper, South Euclid, OH (US); Kevin M. Tambascio, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 234 days.

(21) Appl. No.: 15/881,439

(22) Filed: Jan. 26, 2018

(65) Prior Publication Data

US 2019/0236313 A1 Aug. 1, 2019

(51) Int. Cl.
*G04B 29/00* (2006.01)
*G08B 21/00* (2006.01)
(Continued)

(52) U.S. Cl.
CPC ............ *G06F 21/73* (2013.01); *G05B 19/048* (2013.01); *G06F 21/44* (2013.01); *H04L 63/08* (2013.01);
(Continued)

(58) Field of Classification Search
CPC .. G06F 21/73; G06F 21/44; G06F 2221/2103; G05B 19/048; H04L 63/08; H04L 63/0823
(Continued)

(56) References Cited

U.S. PATENT DOCUMENTS 5,568,552 A 10/1996 Davis
5,940,591 A * 8/1999 Boyle ................ G06F 21/6218
726/3
(Continued)

FOREIGN PATENT DOCUMENTS

CN 1602643 3/2005
CN 1611088 4/2005
(Continued)

OTHER PUBLICATIONS

Emrah Korkmaz; Industrial Control Systems Security Testbed; p. 1-6; Researchgate.Net; 2016.*
(Continued)

*Primary Examiner* — Monjur Rahim
(74) *Attorney, Agent, or Firm* — Amin, Turocy & Watson, LLP

(57) ABSTRACT

Industrial controller modules are configured with security components that implement backplane-level security protocols, thereby preventing installation of unauthorized modular devices on the backplane of an industrial controller. When a modular device is installed in the controller's chassis and interface with the backplane, security components in the processor module or other supervisory module initiates exchange of authentication data with the modular device via the backplane. The authentication data can comprise one or more security challenges to which the modular device must respond correctly before the modular device is permitted to operate on the backplane. These backplane-level security protocols can prevent installation of rogue modules that may be used to collect proprietary control data or interfere with control processes.

20 Claims, 19 Drawing Sheets

(51) Int. Cl.
*G08B 13/00* (2006.01)
*G06F 11/00* (2006.01)
*G06F 1/26* (2006.01)
*G06F 21/73* (2013.01)
*H04L 29/06* (2006.01)
*G06F 21/44* (2013.01)
*G05B 19/048* (2006.01)

(52) U.S. Cl.
CPC .............. *H04L 63/0823* (2013.01); *G05B 2219/45103* (2013.01); *G06F 2221/2103* (2013.01)

(58) Field of Classification Search
USPC .......................................................... 726/34
See application file for complete search history.

(56) References Cited

U.S. PATENT DOCUMENTS

| | | | |
|---|---|---|---|
| 6,240,183 | B1 | 5/2001 | Marchant |
| 6,539,478 | B1* | 3/2003 | Furuya ................ G06F 21/305 713/150 |
| 6,691,231 | B1 | 2/2004 | Lloyd et al. |
| 6,725,104 | B2 | 4/2004 | Lo et al. |
| 6,842,628 | B1* | 1/2005 | Arnold .................... H04L 51/24 455/556.2 |
| 6,895,502 | B1 | 5/2005 | Fraser |
| 7,079,020 | B2* | 7/2006 | Stilp .................... G06K 7/0008 340/506 |
| 7,171,662 | B1 | 1/2007 | Misra et al. |
| 2002/0049818 | A1 | 4/2002 | Gilhuly et al. |
| 2003/0023867 | A1* | 1/2003 | Thibadeau ............ G06F 21/805 713/165 |
| 2003/0028488 | A1 | 2/2003 | Mohammed et al. |
| 2003/0060900 | A1 | 3/2003 | Lo et al. |
| 2003/0206100 | A1 | 11/2003 | Richman et al. |
| 2005/0102240 | A1* | 5/2005 | Misra .................... G06Q 30/06 705/59 |
| 2005/0210532 | A1* | 9/2005 | Winick .................. H04L 63/20 726/22 |
| 2006/0136558 | A1* | 6/2006 | Sheehan ............ H04L 12/2803 709/203 |
| 2016/0070930 | A1* | 3/2016 | Brown ...................... G06F 1/28 726/34 |
| 2016/0235020 | A1* | 8/2016 | Nickerson ............... A01G 25/16 |
| 2017/0147807 | A1* | 5/2017 | Rooyakkers ........... G06F 21/44 |

FOREIGN PATENT DOCUMENTS

| | | |
|---|---|---|
| EP | 1 414 215 A2 | 4/2004 |
| EP | 1 414 216 A2 | 4/2004 |
| EP | 1 645 926 A1 | 4/2006 |
| EP | 3 054 385 A1 | 8/2016 |
| WO | 01/72012 A2 | 9/2001 |
| WO | 03034774 | 4/2003 |
| WO | 03041422 | 5/2003 |
| WO | 2005/088893 | 9/2005 |
| WO | 2006/138469 A2 | 12/2006 |

OTHER PUBLICATIONS

Office Action for U.S. Appl. No. 11/537,413 dated Sep. 15, 2008, 26 pages.
Office Action for U.S. Appl. No. 11/627,477 dated Jan. 7, 2010, 22 pages.
English translation of Office Action dated Sep. 18, 2009 for Chinese Patent Application No. 200710306678.2, 6 pages.
The Application of the Distributive Half Duplex Wireless Communication Technique in Industrial Alarm/Control System, pp. 78-81, Jan. 1, 2002.
Office Action for U.S. Appl. No. 11/627,477 dated Jul. 27, 2010, 38 pages.
English translation of Office Action dated 8/30110 for Chinese Patent Application No. 200710306678.2, 9 pages.
Office Action for U.S. Appl. No. 11/627,477 dated Jan. 7, 2011, 22 pages.
Extended European Search Report received for European Patent Application Serial No. 19153411.5 dated May 22, 2019, 9 pages.
Communication pursuant to Rule 69 EPC received for European Patent Application Serial No. 19153444.5 dated Aug. 5, 2019, 2 pages.
Extended European Search Report received for European Patent Application Serial No. 07117217.5 dated Jun. 24, 2014, 8 pages.
Partial European Search Report received for European Patent Application Serial No. 081010035 dated Mar. 19, 2015, 6 pages.
Extended European Search Report received for European Patent Application Serial No. 08101003.5 dated Jul. 30, 2015, 11 pages.
Communication pursuant to Article 94(3) EPC received for European Patent Application Serial No. 08101003.5 dated Oct. 6, 2017, 6 pages.
Wong et al., "Mutual Authentication and Key Exchange for Low Power Wireless Communications", vol. 1, Oct. 28, 2001, pp. 39-43.
Daley, Wiliam M., "Entity Authentication Using Public Key Cryptography", Archived NIST Technical Series Publication, URL:https://csrc.nist.gov/publications/fips/fips196/fips196.pdf, Feb. 18, 1997, pp. 1-53.
Chinese Search report received for Chinese Patent Application Serial No. 2008100856897 dated Mar. 17, 2011, 1 page.

* cited by examiner

AUTHENTICATED BACKPLANE ACCESS

BACKGROUND

The subject matter disclosed herein relates generally to industrial automation systems, and, more particularly, to implementation of security policies in an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial controller module is provided, comprising a program execution component configured to execute an industrial control program that controls output signals of an industrial controller based on input signals received by the industrial controller, wherein the output signals and the input signals are conveyed via a backplane of the industrial controller; and a device authentication component configured to detect installation of a modular device on the backplane of the industrial controller, to exchange authentication data with the modular device via the backplane during a device authentication sequence, and to initiate operation of the modular device on the backplane in response to determining, based on a result of the authentication sequence, that the modular device is authorized to operate on the backplane.

Also, according to one or more embodiments, a method for implementing industrial controller security is provided, comprising in response to detecting installation of a modular device on a backplane of an industrial controller, executing, by an industrial controller module comprising a processor, an authentication sequence that determines an authenticity of the modular device based on an exchange of authentication data via the backplane; and in response to determining, based on a result of the authentication sequence, that the modular device is an authorized device, initiating operation of the modular device on the backplane; or in response to determining, based on the result of the authentication sequence, that the modular device is not an authorized device, disabling operation of the modular device on the backplane.

Also, a non-transitory computer-readable medium is provided having stored thereon executable instructions that, in response to execution, cause a, industrial controller module comprising at least one processor to perform operations, the operations comprising detecting installation of a modular device on a backplane of an industrial controller; in response to the detecting, sending a request for security credential data to the modular device via the backplane; in response to receiving the security credential data via the backplane, determining whether the security credential data is authentic; in response to determining that the security credential data is authentic, generating challenge data based on information contained in the security credential data; sending the security challenge data to the modular device via the backplane; and in response to determining that the security credential data is not authentic or that a response to the security challenge data received from the modular device via the backplane is not correct, disable operation of the modular device on the backplane.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
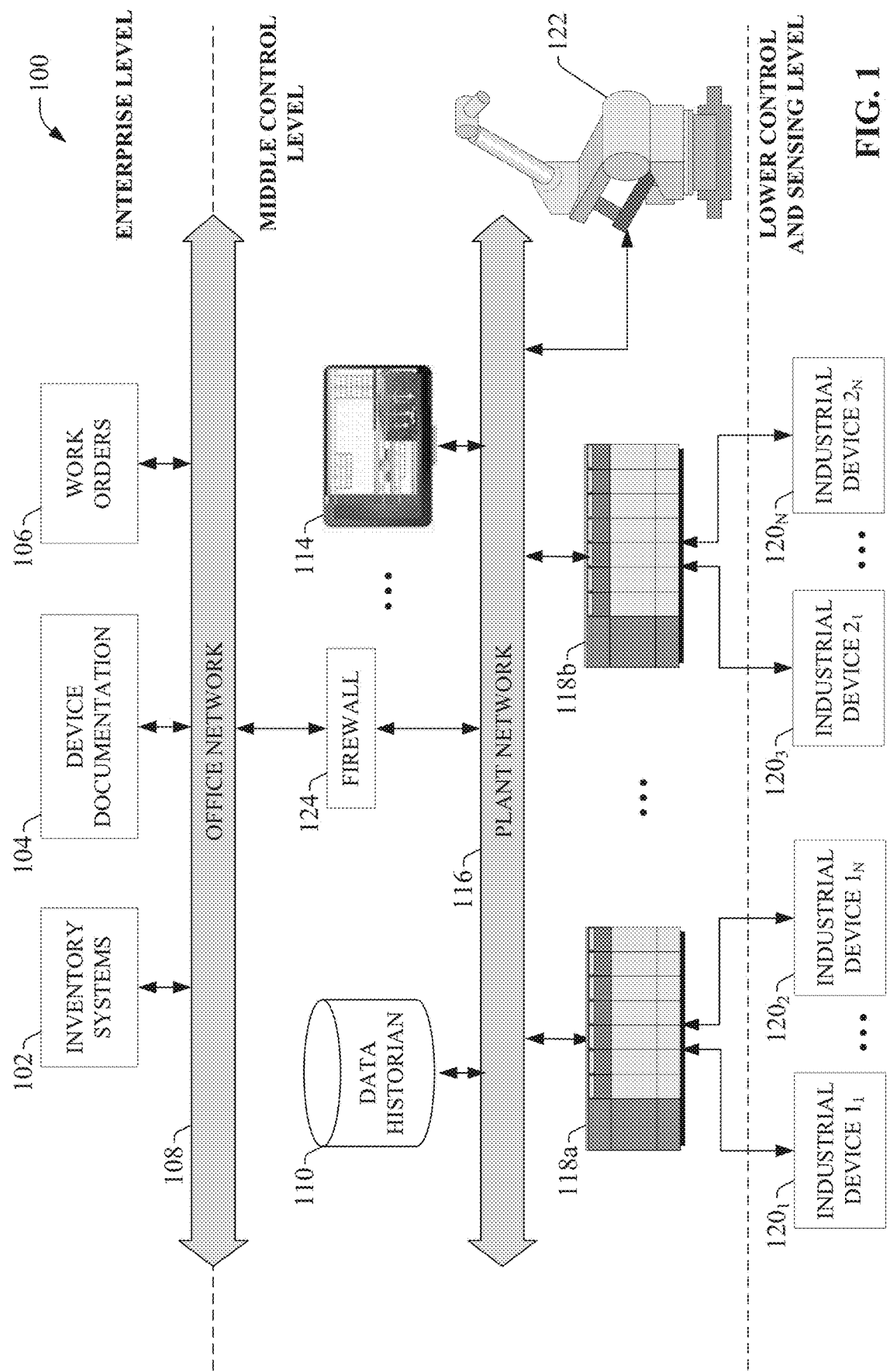
FIG. 1 is a diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100, including a number of diverse industrial devices and assets. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane—e.g., a backplane installed in the back of the controller's chassis, which serves as a power and data bus between the I/O modules and the controller—such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial devices or assets can include industrial robots 122, which may operate in accordance with programs executed by their own internal controllers, in conjunction with information exchanged with one or more external controllers (e.g., industrial controllers 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include one or more data historians 110 that aggregate and store production information collected from the industrial controllers 118 or other data sources, or a device documentation store 104 containing electronic documentation for the various industrial devices making up the controlled industrial systems. Other industrial devices or assets may include inventory tracking systems 102, work order management systems 106, enterprise resource planning (ERP) systems, manufacturing execution systems (MES), or other such business-level systems, some or all of which may reside on an office network 108 of the industrial environment (e.g., a separately managed network relative to plant network 116). The industrial network environment may also include a number of network architecture devices—such as firewall 124, hubs, routers, or switches—that connect separate networks and/or networked devices and manage data flow between the various devices and networks.

Figure 2:
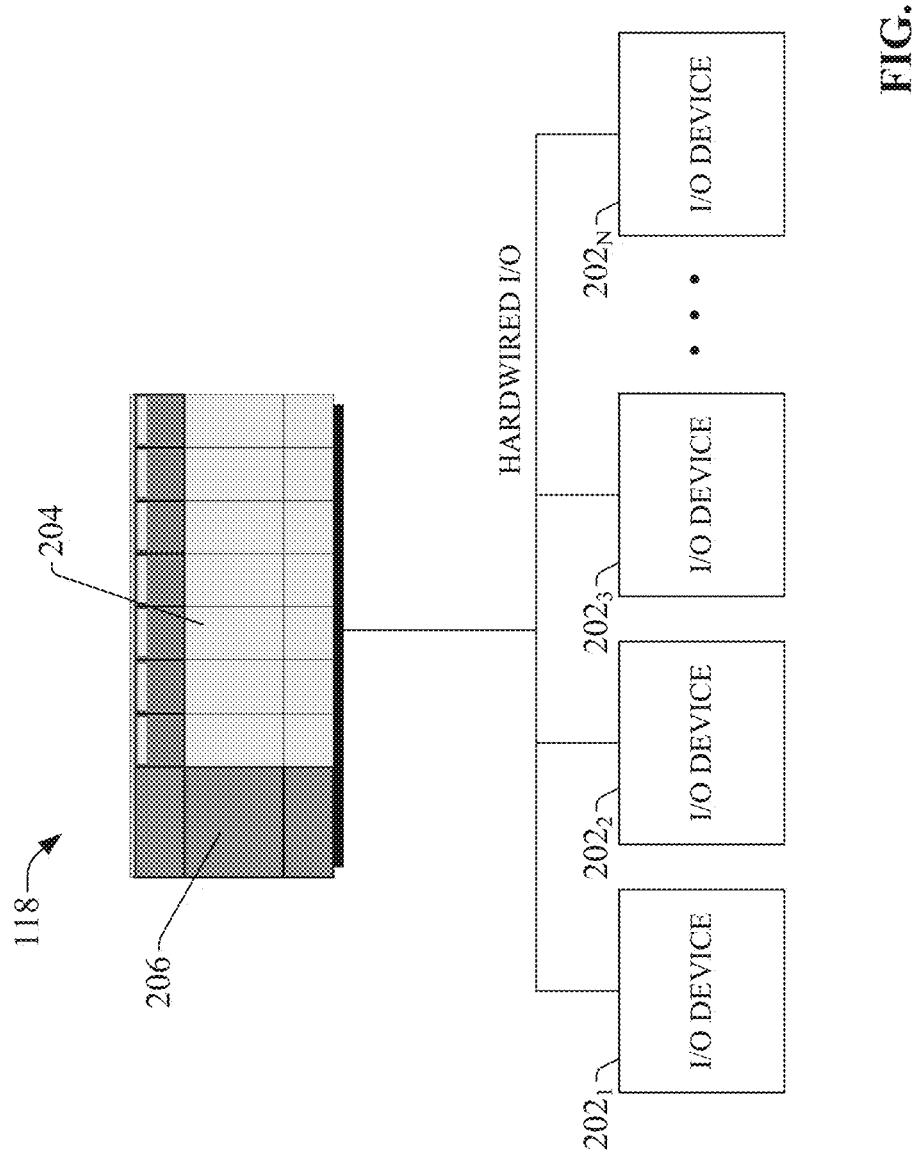
FIG. 2 is a diagram illustrating hardwired I/O connections between an industrial controller and I/O devices.

Industrial devices 120, processes, or machines controlled by industrial controllers 118 typically comprise one or more I/O devices that are electrically connected to the industrial controller 118 via the controller's I/O modules, as illustrated in FIG. 2. These I/O devices 202 may comprise digital input devices (e.g., push buttons, selector switches, safety devices, proximity switches, photo sensors, etc.), digital output devices (e.g., solenoid values, indicator lights, motor contactors, etc.), analog input devices (e.g., 4-20 mA telemetry devices, 0-10 VDC telemetry devices, or other analog measurement devices), or analog output devices (e.g., variable frequency drives, flow control valves, speed control devices, etc.). Typically, each I/O device 202 is wired to a terminal of an appropriate I/O module 204 of industrial controller 118. I/O modules are generally classified as digital input, digital output, analog input, or analog output modules to accommodate the different types of I/O devices 202.

To suit the needs of each particular control application, some industrial controllers comprise a multi-slot chassis that allows a selected I/O module to be installed in each slot of the chassis. One slot of the chassis is typically dedicated to the controller's processor module 206, although some designs allow the processor module 206 to be inserted into any slot of the chassis. When a processor module 206, I/O module 204, or other type of special function module (e.g., a networking module or special function module) is installed in the controller's chassis, the module interfaces with a backplane installed at the rear of the chassis. The backplane serves as a power and data bus that both provides power to the I/O modules—typically sourced by a dedicated power module installed in the chassis 304—and also serves as a path for data exchange between the processor module 206 and the I/O modules 204. For example, digital and analog input modules provide their measured input values to the processor module via the backplane, and the processor module sends programmatic digital and analog values to selected digital or analog output modules via the backplane for conversion to electrical output signals.

Figure 3:
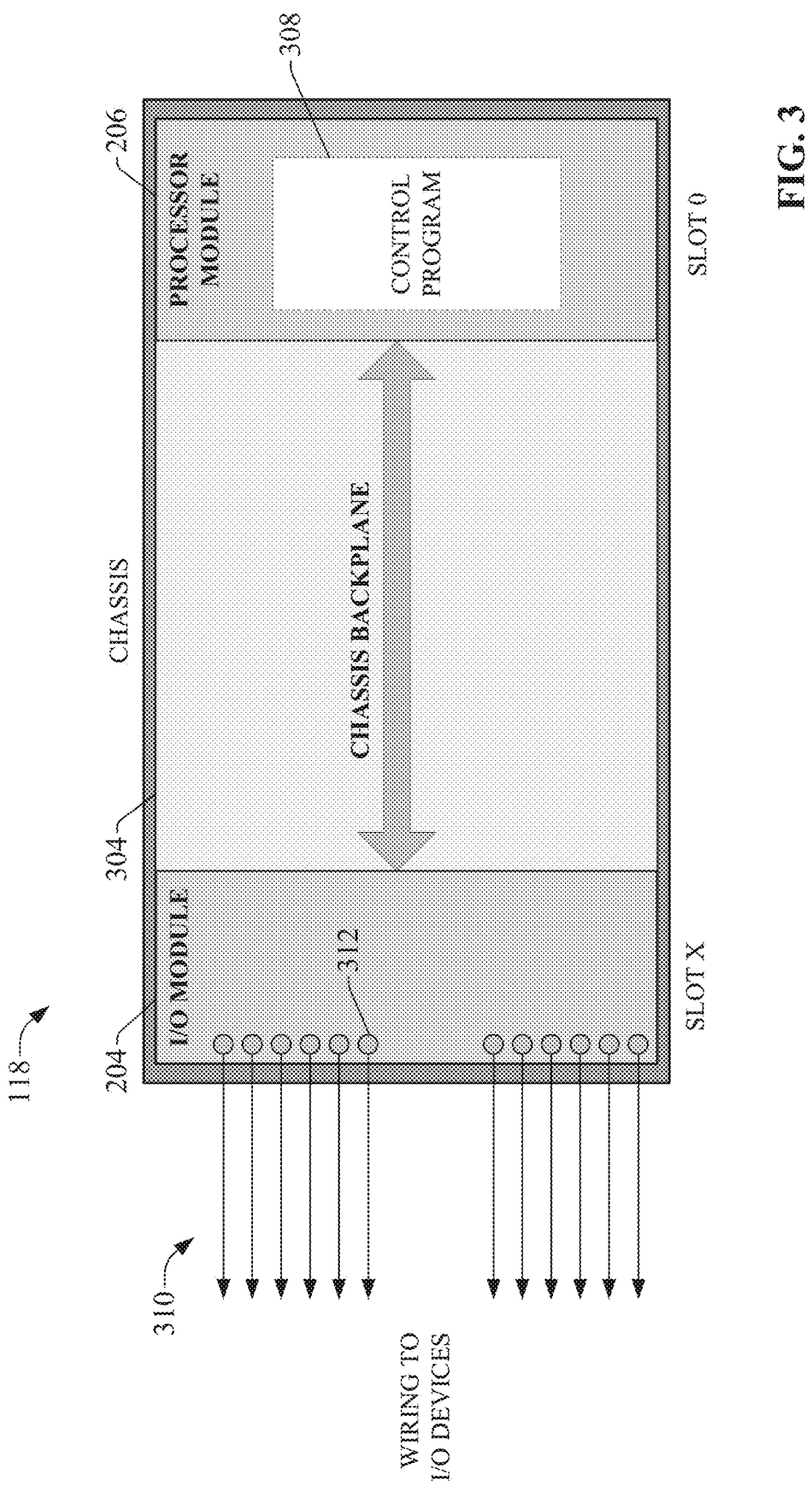
FIG. 3 is a diagram illustrating communication between a processor module and an I/O module within an industrial controller chassis.

FIG. 3 is a diagram illustrating communication between a processor module 206 and an I/O module 204 within an industrial controller chassis 304. One or more terminals 312 of I/O module 204 is wired to an I/O device (e.g., I/O devices 202) via field wiring 310, allowing electrical signals to be exchanged between the I/O device and I/O module 302. If the I/O module 204 is an input module, each input I/O device provides a discrete (e.g., 24 VDC) or analog (e.g., 4-20 mA or 0-10 VDC) electrical signal to the I/O module 204 via field wiring 310 for processing by processor module 206. If the I/O module 204 is an output module, the I/O module 204 sends discrete or analog output signals to the I/O devices via field wiring 310 in accordance with commands issued by the processor module 206. Processor module 206 executes a user-defined control program 308 (e.g., a ladder logic program, a sequential function block program, etc.) that controls the output signals sent to the output field devices via the output modules as a function of the received input signals and user-defined control sequences. The I/O module 204 exchanges this input and output data with processor module 206 via a data bus of the backplane, which is located at the back of the chassis 304. Typically, when an I/O module 204 or processor module 206 is inserted into a slot of the chassis 304, an interface connector on the rear side of the module plugs into the backplane, thereby providing a means for data exchange between the processor module 206 and I/O module 204. The backplane also includes a power bus that provides power to the I/O module 204 and the processor module 206.

Figure 4:
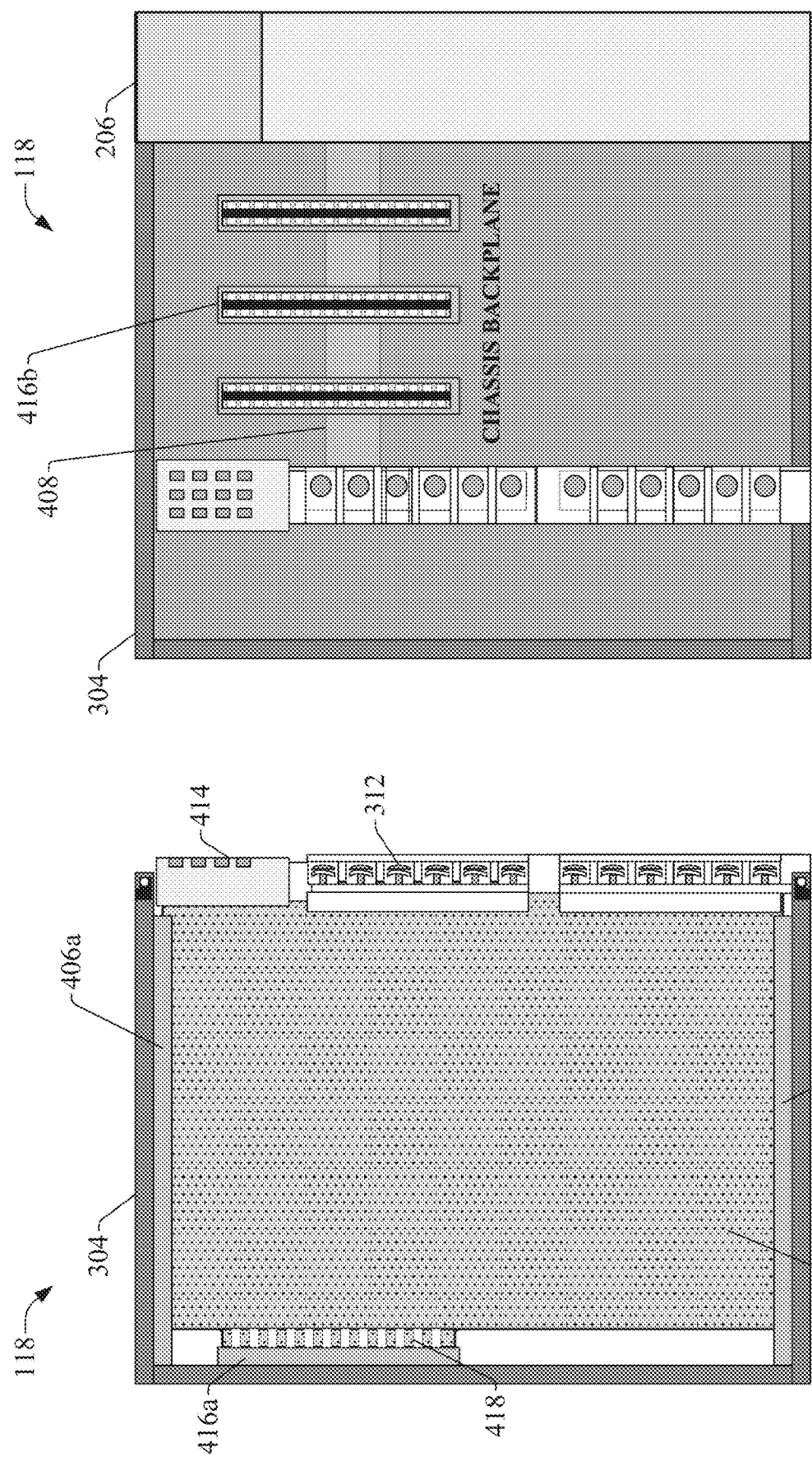
FIG. 4A is a side view of an example industrial controller that illustrates connectivity of an I/O module to the controller's backplane.
FIG. 4B is a front view of an example industrial controller that illustrates connectivity of an I/O module to the controller's backplane.

FIGS. 4A and 4B are side and front views, respectively, of an example industrial controller 118 that illustrates connectivity of an I/O module 204 to the controller's backplane 408. Example industrial controller 118 comprises a chassis 304, a processor module 206, and an I/O module 204. For clarity, only a single I/O module 204 is illustrated in FIGS. 4A and 4B. In this example, processor module 206 resides in the right-most slot of the chassis 304, while I/O module 204 resides in the fourth slot to the left of processor module 206. The I/O module 204 may comprise, for example, a printed circuit board containing the components for carrying out the module's functions (e.g., circuitry for communicating with the processor module 206, circuitry for conditioning input signals from the terminals 312 for transfer over the backplane 408, circuitry for generating terminal output signals in accordance with commands from processor module 206 received via the backplane 408, etc.). Some I/O modules 204 may also comprise a housing that fully or partially encloses the circuit board. In the illustrated example, guide rails 406a and 406b are located at the top and bottom of chassis 304 for each slot, and are designed to guide the I/O module 204 into the slot and align the backplane connector 418 of the I/O module 204 with backplane interface port 416a at the rear of chassis 304 (the front view of FIG. 4B shows three unused backplane interface ports 416b). When the I/O module's backplane connector 418 is connected to the backplane interface port 416a, the I/O module 204 and processor module 206 are able to exchange information over the backplane 408 (as described above in connection with FIG. 3). The backplane 408 also provides power to the I/O module 204 and processor module 206. Power is typically sourced by a power supply module (not shown) installed in one of the available slots, or in a dedicated power supply slot.

Some I/O modules 204 may include a front indicator panel 414 with status indicators—e.g., color-coded light emitting diodes (LEDs)—for conveying status information for each of the I/O points of the module 204, and/or general module status information.

Since many industrial devices, systems, and assets reside on plant and/or office networks, system designers often configure network security protocols that prevent unauthorized access to the industrial assets by unauthorized users or devices. Such security measures are required to prevent unauthorized viewing of production data or other sensitive information, or to prevent remote entities from assuming control of the industrial assets and modifying control sequences or device parameters.

However, even with network-level security in place, controller backplanes (e.g., backplane 408) still represent a potential attack vector through which an unauthorized entity can gain low-level access to control system information. Backplane-level security risks have not generally been considered by system designers or equipment vendors, since the unique physical or electrical characteristics of the backplane, proprietary and undocumented messaging protocols often used to exchange data across the backplane, and the outer physical layers of security surrounding the backplane (e.g., the fact that the industrial controller is typically enclosed inside a control cabinet) have discouraged system designers from considering the potential security vulnerabilities associated with the controller backplane. However, despite these inherent security layers, the backplane of an industrial controller—which utilizes little or no access control technology—can potentially be reverse engineered by malicious parties to learn the physical, electrical, and communication characteristics of the backplane. With this information, rogue modules designed to disrupt the control system or record proprietary control system information can be configured and installed in the controller chassis by such malicious parties. These rogue modules could allow such parties to gain access to the user's control system, collect proprietary information about the user's control system, tamper with control system data, interfere with real-time control carried out by the controller resulting in a denial of service, spoof legitimate control devices, or gain unauthorized access to other more secure networks or data busses within the plant.

To address these and other issues, one or more embodiments of the present disclosure provide industrial controllers configured with backplane-level security protocols. In one or more embodiments, industrial controller processor modules or other supervisory modules can perform security authentication on individual modular devices on the controller's backplane (e.g., I/O modules, networking modules, etc.), and will only allow the installed module to operate on the backplane if the module is authenticated. In response to detection of an unauthorized module, the supervisory module can execute one or more actions to prevent the unauthorized module from functioning on the backplane; e.g., by disabling data connectivity to the module, by disconnecting power to the module or to the backplane as a whole, etc. In some embodiments, the supervisory module can also generate a notification of the detected rogue module directed to a log server, to an HMI, or to one or more specified client devices associated with responsible plant personnel. The supervisory module (e.g., a processor module, and adaptor module, a networking module, or another type of supervisory module) can be configured to authenticate both vendor-approved devices and user-approved devices.

Any suitable technique for authenticating controller modules across the controller's backplane are within the scope of one or more embodiments of this disclosure. For example, in some embodiments modules manufactured by an authorized equipment vendor can be provisioned with digital vendor certificates that are unique to each module, and the supervisory module can authenticate modules or devices plugged into the controller's backplane based on a private key infrastructure (PKI). However, the industrial backplane-level security techniques described herein are not limited to such security protocols, and any suitable security protocol for implementing backplane-level security within industrial controller components are within the scope of one or more embodiments of this disclosure.

Figure 5:
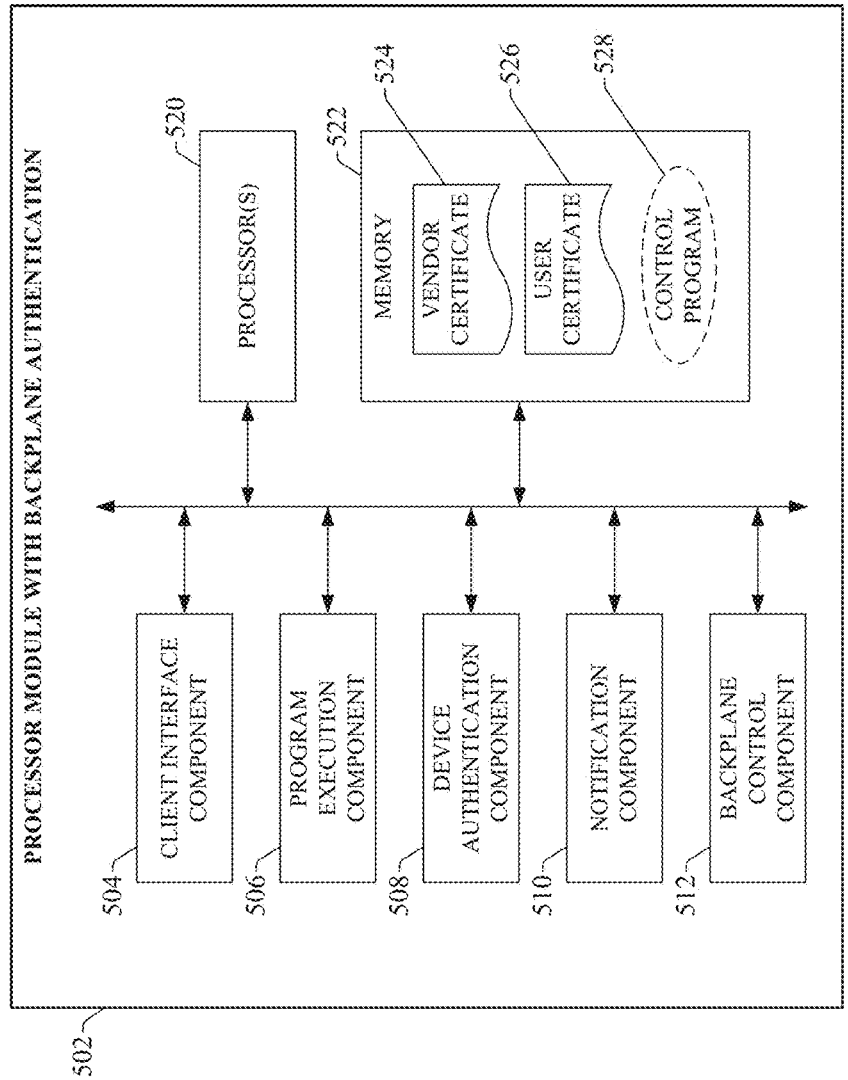
FIG. 5 is a block diagram of an example industrial controller processor module with backplane authentication.

FIG. 5 is a block diagram of an example industrial controller processor module 502 with backplane authentication. Although examples described herein assume that the supervisory authentication functionality is embodied in a processor module 502 (e.g., such as processor module 206), supervisory authentication functionality can also be embodied in other types of controller modules or devices that interface with the controller's backplane, including but not limited to remote I/O adapter modules, networking modules, dedicated security modules, special function modules, or other types of controller modules. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Processor module 502 can include a client interface component 504, a program execution component 506, a device authentication component 508, a notification component 510, a backplane control component 512, one or more processors 520, and memory 522. In various embodiments, one or more of the client interface component 504, program execution component 506, device authentication component 508, notification component 510, backplane control component 512, the one or more processors 520, and memory 522 can be electrically and/or communicatively coupled to one another to perform one or more of the functions of the processor module 502. In some embodiments, components 504, 506, 508, 510, 512, and 514 can comprise software instructions stored on memory 522 and executed by processor(s) 520. Processor module 502 may also interact with other hardware and/or software components not depicted in FIG. 5. For example, processor(s) 520 may interact with one or more external user interface devices, such as a keyboard, a mouse, a display monitor, a touchscreen, or other such interface devices.

Client interface component 504 can be configured to exchange data with a client device interfaced with the processor module 502, such as a desktop, laptop, or tablet computer; a mobile device such as a smart phone; or other such client device. As will be described in more detail below, connectivity between the client device and processor module 502 can allow a user to define the control program 528 (e.g., ladder logic or other type of industrial control program) to be executed by the processor 520, as well as to define a subset of modular backplane devices that are authorized for communication with the processor module 502 over a controller backplane.

Program execution component 506 can be configured to execute a control program 528 (e.g., a ladder logic program, a sequential function chart program, etc.) stored on the processor module's memory 522 to facilitate monitoring and control of an industrial process via other digital, analog, and/or networked I/O modules that share a backplane (or I/O network) with the processor module 502.

Device authentication component 508 can be configured to implement backplane-level security for the industrial controller in which the processor module is installed by authenticating all modular devices (e.g., I/O modules, networking modules, special function modules, etc.) installed on the controller's backplane. In some embodiments, authentication of authorized modules can be based on one or both of vendor certificate data 524 (issued to the processor module 502 during manufacture of the module) or user certificate data 526 (issued to the processor module 502 by the end user using a trust authority), which can be stored on memory 522 of the processor module 502.

Notification component 510 can be configured to generate notification data in response to detection of an unauthorized modular device installed on the controller's backplane. This can include, for example, generating a time-stamped log entry identifying detection of the unauthorized modular device, and either storing the log entry locally on memory 522 or sending the log entry to a remote server device. In another example, notification component 510 can be configured to deliver the notification to one or more client devices associated with suitable plant personnel, e.g., via a text message directed to the client devices, as an email directed to the personnel's email addresses, or by other means.

Backplane control component 512 can be configured to modify operation of the controller's backplane based on results of the authentication procedure for a modular device installed on the backplane. For example, in response to a determination by the device authentication component 508 that a modular device that has been installed on the backplane is not an authorized device, backplane control component 512 can disable backplane communications to and from the slot in which the unauthorized device is installed. This can be achieved by instructing the processor module 502 to disable data read and write operations to the unauthorized module. For embodiments in which the backplane is equipped with switches capable of physically isolating the modular devices in each slot from the backplane, the backplane control component 512 may also instruct one or more backplane switches associated with the slot to open, thereby disconnecting the unauthorized module from the backplane's power bus and/or data bus. In yet another example, backplane control component 512 may be configured to disconnect power from the entire backplane in response to detection of an unauthorized module in any of the controller's slots, thereby deenergizing all modules in the controller. Other countermeasures are also within the scope of one or more embodiments. For example, rather than modifying backplane operation, device authentication component 508 may instead instruct program execution component 506 to disable run mode for the processor module 502 if any of the installed modules are not authorized. This prevents the control program 528 from executing until such time as the device authentication component 508 authorizes all modular devices installed in the controller.

The one or more processors 520 can perform one or more of the functions described herein with reference to the systems and/or methods disclosed. Memory 522 can be a computer-readable storage medium storing computer-executable instructions and/or information for performing the functions described herein with reference to the systems and/or methods disclosed.

Figure 6:
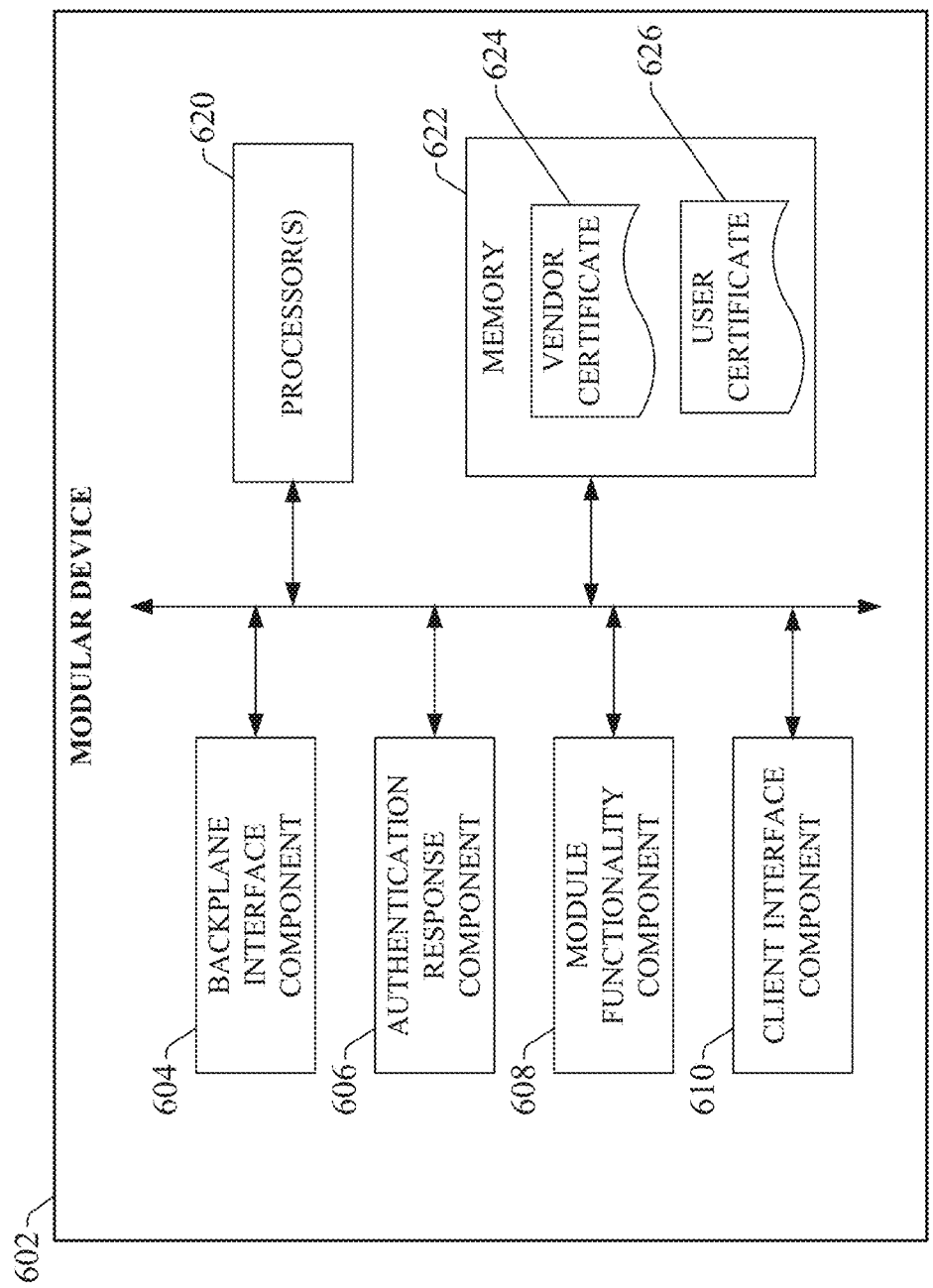
FIG. 6 is a block diagram of an example modular device that supports backplane authentication.

FIG. 6 is a block diagram of an example modular device 602 that supports backplane authentication. Modular device 602 can be substantially any type of industrial controller module that can be installed on the backplane of an industrial controller, including but not limited to a digital or analog input module, a digital or analog output module, a networking module, a special function module, or another type of module.

Modular device 602 can include a backplane interface component 604, an authentication response component 606, a module functionality component 608, a client interface component 610, one or more processors 620, and memory 622. In various embodiments, one or more of the backplane interface component 604, authentication response component 606, module functionality component 608, client interface component 610, the one or more processors 620, and memory 622 can be electrically and/or communicatively coupled to one another to perform one or more of the functions of the modular device 602. In some embodiments, components 604, 606, and 608 can comprise software instructions stored on memory 622 and executed by processor(s) 620. Modular device 602 may also interact with other hardware and/or software components not depicted in FIG. 6. For example, processor(s) 620 may interact with one or more external user interface devices, such as a keyboard, a mouse, a display monitor, a touchscreen, or other such interface devices.

Backplane interface component 604 can be configured to electrically and communicatively connect the modular device 602 to the backplane of an industrial controller (e.g., a backplane installed at the back of the controller chassis). Backplane interface component 604 can include, for example, a backplane connector (e.g., similar to backplane connector 418) that plugs into or otherwise interfaces with a backplane interface port (e.g., similar to backplane interface port 416), together with any electronics or software necessary to exchange data with and receive power from the backplane. The authentication response component 606 can be configured to respond to requests for authentication information from the processor module 502. In some scenarios, authentication response component 606 can generate responses to requests from the processor module 502 based on vendor certificate data 624 and/or user certificate data 626 stored on memory 622 of the modular device 602. For example, depending on the nature of the request received from the device authentication component 508, authentication response component 606 may provide one or both of vendor certificate data 624 or user certificate data 626 to the processor module 502, or may provide a hash value that has been decrypted using an encryption key defined by the vendor certificate data 624.

Module functionality component 608 can be configured to carry out native functions of the modular device 602 in accordance with the type of modular device 602. For example, if modular device 602 is an analog output module, module functionality component 608 can be configured to generate voltage or current output signals (e.g., 0-10 VDC or 4-20 mA outputs) proportional to analog values defined by the control program 528 executing on the processor module 502, and to output the generated signals on the module's output terminals. If the modular device 602 is an analog input module, module functionality component 608 can be configured to generate analog values for processing by the control program 528, where the analog values are proportional to analog electrical signals received at the module's input terminals. Other types of module functionality are also within the scope of one or more embodiments.

Client interface component 610 can be configured to exchange data with a client device interfaced with the modular device 602, such as a desktop, laptop, or tablet computer; a mobile device such as a smart phone; or other such client device. As will be described in more detail below, connectivity between the client device and modular device 602 can allow a user to provision user certificate data 626 to the modular device The one or more processors 620 can perform one or more of the functions described herein with reference to the systems and/or methods disclosed. Memory 622 can be a computer-readable storage medium storing computer-executable instructions and/or information for performing the functions described herein with reference to the systems and/or methods disclosed.

Figure 7:
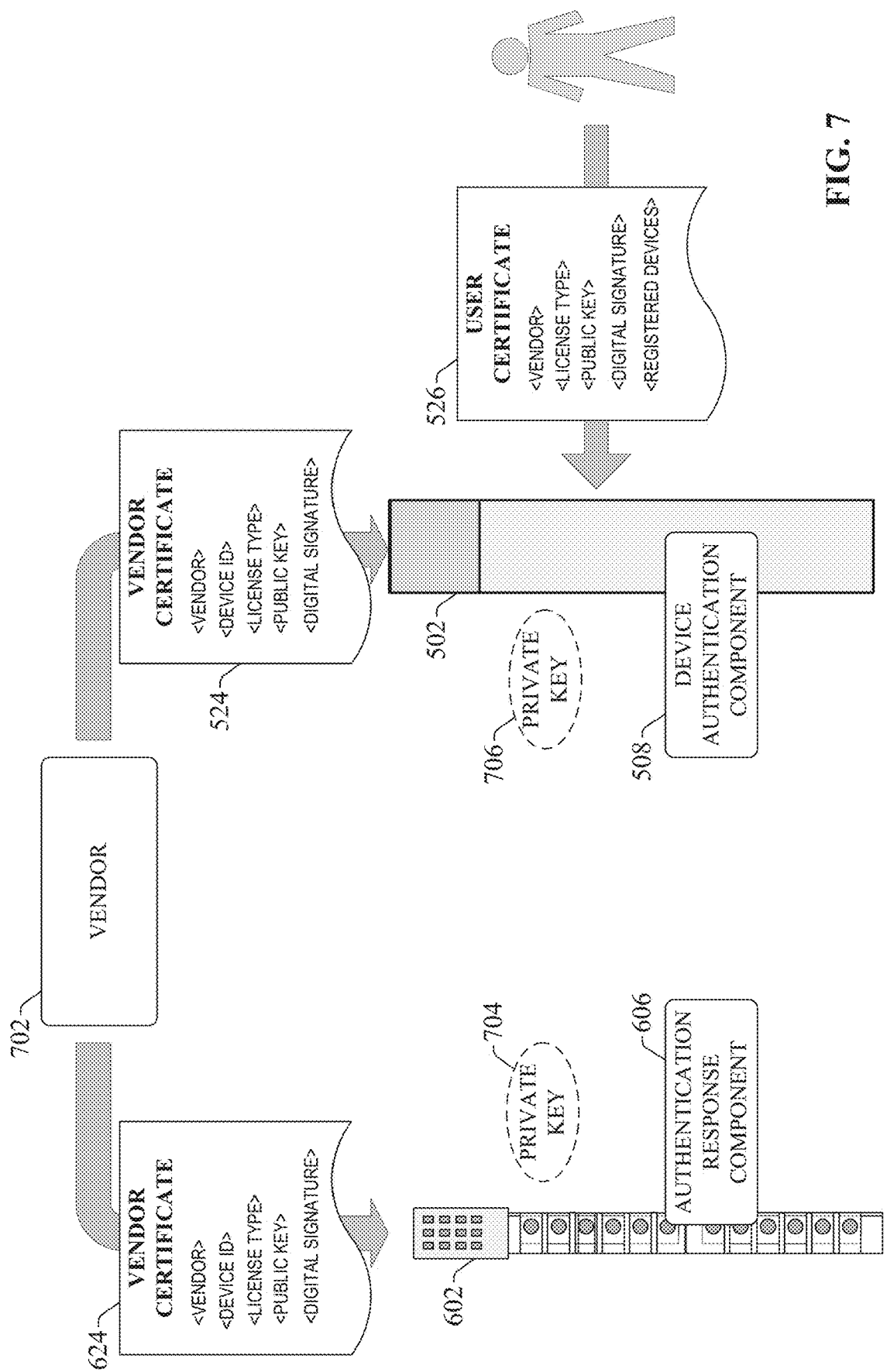
FIG. 7 is a diagram illustrating issuance of vendor certificate data to both a modular device and a processor module.

As noted above, one or more embodiments of the architecture described herein supports a backplane authentication protocol that requires modular devices (e.g., I/O modules, special function modules, networking modules, etc.) to prove authenticity in order to gain access to the backplane or to operate on the backplane. In an example implementation, authentication of controller modules (e.g., modular device 602) can rely on vendor certificates to protect access to the backplane. FIG. 7 is a diagram illustrating issuance of vendor certificate data to both a modular device 602 and a processor module 502. In this example configuration, the processor module 502, when installed in an industrial controller chassis and interfaced with the controller's backplane 408, will authenticate any modular device 602 that is also installed on the backplane 408. Accordingly, both the processor module 502 and all supported modular devices 602 are issued with vendor certificate data 524 and 624, respectively, at the time of manufacture. The vendor certificate data issued to each authorized device is unique to that device. In some embodiments, the format of vendor certificate data 524 and 624 can conform to the X.509 standard, or another suitable cryptographic standard. Using vendor certificate data 524 and 624, authentication of modular devices installed on the backplane can be performed using techniques similar to public key infrastructure (PKI) authentication. Although examples described herein assume the use of digital certificates and PKI authentication, it is to be appreciated that the backplane-level security features described herein are not limited to such protocols, and that any backplane-level security protocol is within the scope of one or more embodiments.

Vendor certificate data 624 and 524 can include such information as an identity of the vendor 702 of devices 502 and 602, device identification information that uniquely identifies the device (e.g., a physical device identifier such as a media access control (MAC) address), indication of a license type specifying a scope of allowed access for the device, public key data used to identify valid license certificates issued by the vendor 702 (acting as a certificate authority), and digital signature information. The digital signature contained in the modular device's vendor certificate data 624 can be verified by the device authentication component 508 of the processor module 502 (or another modular supervisory device responsible for verifying authenticity of modular devices 602) using a public key issued to the processor module 502 as part of the processor module's vendor certificate 524. By validating the modular device's digital signature in this manner, the processor module 502 can confirm that the vendor certificate data 624 provided by the modular device 602 is valid, authentic, and has not been tampered with.

For the purposes of this example, vendor 702 is assumed to be the business entity that manufactures and sells modular devices 602 and processor modules 502. However, in some scenarios the certificate authority could be another trusted third-party entity—e.g., a security entity or a partner entity—that has been granted authorization by the equipment vendor to issue licenses for the purposes of backplane-level security.

In the illustrated example, issuance of certificate data 624 and 542 to the modular device 602 and process module 502, respectively, by vendor 702 (or another trusted certificate authority) causes private key data 704 and 706 to be enrolled into the vendor's PKI. Private key data 704 corresponds to the public key included in the modular device's vendor certificate data 624, while private key data 706 corresponds to the public key included in the processor module's vendor certificate data 524. The private key data 704 and 706 can be protected in hardware of their respective devices (e.g., using hardware security modules, or using other hardware protection means) to render the private key data impervious to cloning. During authentication, a device's private key data can be used to verify that the device is the authentic holder of its asserted vendor certificate.

As will be described in more detail below, in addition to vendor certificate data 524, processor module 502 can also support the use of user certificate data 526, which can be issued to the module 502 by the end user using a certificate authority application, as will be described in more detail below.

Figure 8:
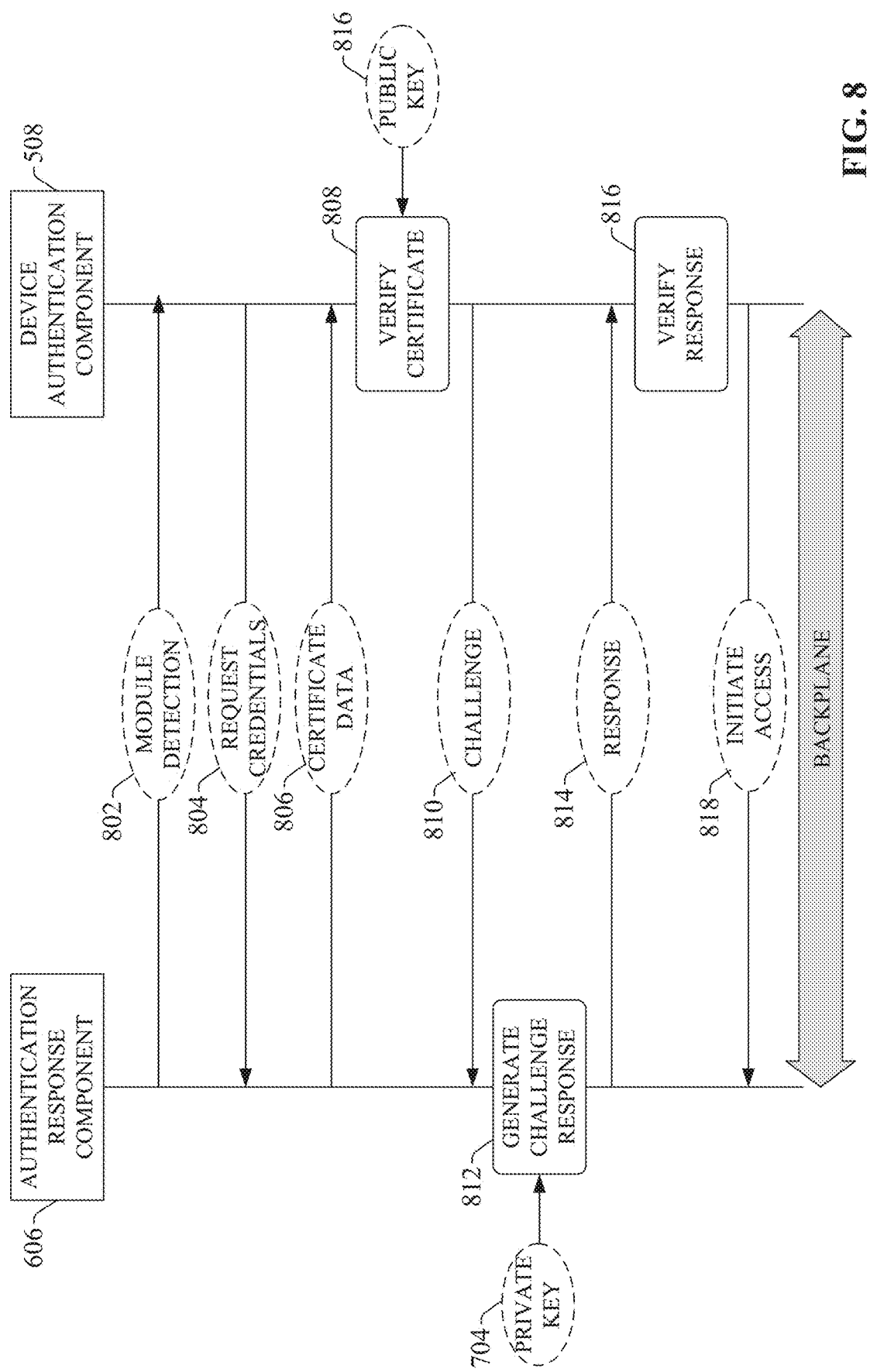
FIG. 8 is a diagram illustrating an example authentication sequence between a processor module and a modular device that shares a backplane with the processor module.

FIG. 8 is a diagram illustrating an example authentication sequence between a processor module 502 and a modular device 602 that shares a backplane with the processor module 502. In this example, it is assumed that the processor module 502 has been installed in the controller chassis and is interfaced with the controller backplane. In general, the authentication sequence can be initiated by the processor module 502 in response to detecting that modular device 602 has also been installed on the backplane. In some embodiments, the authentication sequence can also be initiated in response to initialization of the processor module 502. For example, when the processor module 502 is powered on or otherwise initialized, the processor module's device authentication component 508 can execute the authentication sequence on each modular device 602 currently installed on the backplane. In the sequence illustrated in FIG. 8, all data communication between the processor module 502 and the modular device 602 is performed via the controller backplane (e.g., backplane 408).

When modular device 602 is installed on the controller backplane, processor module 502 detects the modular device 602 across the backplane at 802. In response to detection of the modular device 602, the processor module's device authentication component 508 issues a request for the modular device's credentials at 804. In response to receiving the request, the modular device 602 responds by sending a copy of its vendor certificate data 624 (or user certificate data 526, to be described in more detail below) to the processor module 502 at 806. By sending the vendor certificate data 624, the modular device 602 provides its vendor-issued digital signature and unique device-specific public key to the processor module 502. Upon receipt of the modular device's vendor certificate data, the processor module 502 decodes and verifies the authenticity of the modular device's vendor certificate at 808. For example, processor module's device authentication component 508 can verify the modular device's vendor certificate by validating the digital signature included in the certificate data 624 using the vendor's public key 816. The vendor's public key 816 can be included in the processor module's vendor certificate 524 issued to the processor module 502 at the time of manufacture (either by the vendor or by another trusted entity that provisions the digital certificates to the devices 502 and 602). The digital signature may be encrypted using the vendor's private key, which corresponds to public key 816. Accordingly, the device authentication component 508 will attempt to verify the digital signature included in the vendor certificate data 624 provided by the modular device 602 using public key 816. If the digital signature is recognized by the device authentication component 508, the processor module 502 verifies that the vendor certificate is authentic and unmodified, and proceeds to the next step in the authentication process. Alternatively, if the vendor certificate is not valid or is not provided by the modular device 602 within a defined timeout period, the device authentication component 508 will deny the modular device 602 access to the backplane.

In response to confirming the authenticity of the vendor certificate data provided by the modular device 602, the processor module's device authentication component 508 can issue a challenge to the modular device 602 via the backplane at 810. Although the vendor certificate data 624 has been found to be authentic, the challenge is designed to confirm that the modular device 602 is the authorized owner of the provided vendor certificate. In this way, the processor module 502 can determine whether the vendor certificate data 624 has been duplicated and installed on an unauthorized device. In an example challenge, the processor module's device authentication component 508 can generate a cryptographically random challenge value (e.g., a randomly generated value) and encrypt this random challenge value using the public key provided in the vendor certificate data 624 that was provided by the modular device 602 at step 806. The processor module 502 then sends the encrypted challenge value to the modular device 602 via the backplane as the challenge.

At 812, if the modular device 602 is authentic, the modular device's authentication response component 606 generates a challenge response based on the challenge provided by the processor module 502 (e.g., the encrypted session key) and the private key data 704 previously issued to the modular device 602. Since the session key was encrypted using the modular device's public key (provided to the processor module 502 as part of the modular device's vendor certificate data 624), the encrypted session key will only be properly decrypted using the corresponding private key data 704 owned by the modular device 602. Accordingly, in response to receiving the challenge at 810, the modular device's authentication response component 606 will decrypt the encrypted session key contained in the challenge using the private key data 704 (which is stored and protected in the modular device's hardware), and send the decrypted session key (e.g., a decrypted hash value) to the processor module 502 via the backplane as a challenge response at 814.

Upon receipt of the response at 814, the processor module's device authentication component 508 verifies the response at 816. For example, the device authentication component 508 can compare the response—e.g., the decrypted session key—provided by the modular device 602 with the original session key generated previously by the device authentication component 508. If the decrypted session key provided by the modular device matches the original session key, the device authentication component 508 assumes that the modular device 602 is an authorized device, and authorizes access to the backplane at 818. At this stage, the installed modular device 602 is permitted to operate normally on the controller backplane, and data exchange between the modular device 602 and the processor module 502 is carried out normally in accordance with the control program 528 and/or controller configuration. Alternatively, if the response provided by the modular device 602 does not correspond to the original session key, access to the backplane will be denied to the modular device 602.

In some embodiments, the degree of access permitted to the modular device 602 may be determined based on the license type defined by the vendor certificate data 624 issued to the modular device 602. For example, depending on the scope of access permitted by the modular device's vendor certificate data 624, the modular device may be granted full read-write access to the processor module 502 via the backplane, read-only access, write-only access, or limited read and/or write access to a defined subset of data registers defined in the process module 502.

The authentication sequence carried out by the device authentication component 508 (either a sequence similar to that described above in connection with FIG. 8 or another suitable device authentication sequence) can be performed in response to detecting that a modular device 602 has been installed on the controller backplane, as well as in response to initialization of the processor module 502 (e.g., during a power-up sequence of the processor module 502, or when the processor module 502 is switched to a run-time operating mode). In some embodiments, the authentication sequence can also be carried out periodically at a default or user-defined defined frequency (e.g., once a day, once an hour, etc.).

Figure 9:
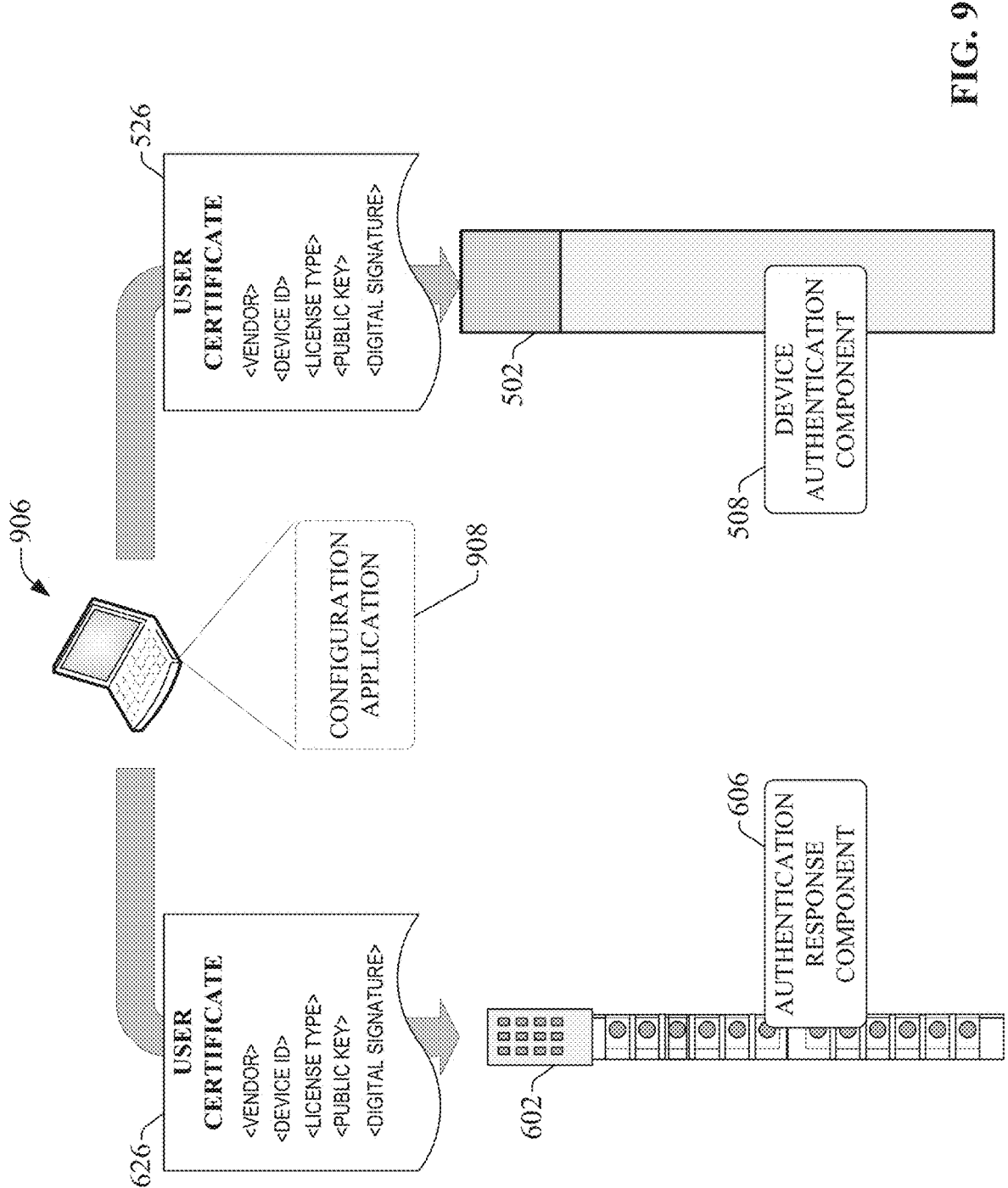
FIG. 9 is a diagram illustrating generation of user certificate data.

Vendor certificate data 624 can ensure that only modular devices 602 that have been authorized by a valid certification authority—e.g., a vendor of the modular devices or a trusted third-party entity that has been authorized by the vendor—are allowed to communicate across the backplane and operate as part of the industrial controller. As noted above, in addition to authentication of modular devices based on vendor certificate data 624, one or more embodiments can also allow the user to issue user certificate data to one or both of the modular devices 602 or the processor module 502. FIG. 9 is a diagram illustrating provision of user certificate data 626 and 526 to modular device 602 and processor module 502. User certificate data 626 and 526 can ensure that only modular devices that have been purchased by the owner of the industrial controller and provisioned with user certificates are permitted to operate on the controller's backplane. This can prevent installation of modular devices 602 that were manufactured and certified by the device vendor but which have been modified or tampered with for the purposes of unauthorized data collection or monitoring, disruption of the control process, spoofing, or other malicious activities.

In an example configuration technique, a user can interface with the processor module 502 or modular device 602 via their respective client interface components 504 and 610; e.g., by communicatively connecting a client device 906 (e.g., a laptop computer, a desktop computer, a tablet computer, a personal mobile device, etc.) to the processor module 502 or modular device 602 over a wired or wireless connection. Client device 906 may execute a configuration program that includes certificate authority functionality capable of generating and issuing user certificate data 626 and 526 to the controller module 602 and/or modular device 502. In some embodiments, the configuration application 908 may be a dedicated certificate authority application, or may be a controller configuration application used to develop and download control program 308 to the processor module 502, as well as to configure other functional aspects for the controller (e.g., networking or communication settings, I/O module definitions, data ranges for analog inputs and outputs, etc.). In the later scenario, the certificate authority functionality can be an add-on or bundled functionality of the controller configuration application.

User certificate data 526 and 626 can be leveraged by processor module 502 in the same manner as vendor certificate data 524 and 624 during the authentication sequence described above. For example, if user certificate data 526 has been created for the processor module 502, device authentication component 508 will use the user certificate data 526 in place of (or in conjunction with) the vendor certificate data 524 to determine whether an installed modular device 602 is to be permitted access to the backplane (if no user certificate data 526 has been created, the vendor certificate data 524 will be used). At step 806 of the sequence described above, the modular device's authentication response component 606 will send its user certificate data in response to the modular device's request for credentials, and the processor module's device authentication component 508 will verify the validity of the modular device using its own user certificate data 526. When user certificate data is used for to validate the modular device 602, the authentication sequence verifies that the modular device 602 is one that has been registered by the user's trust authority (e.g., the certificate authority of configuration application 906).

Figure 10:
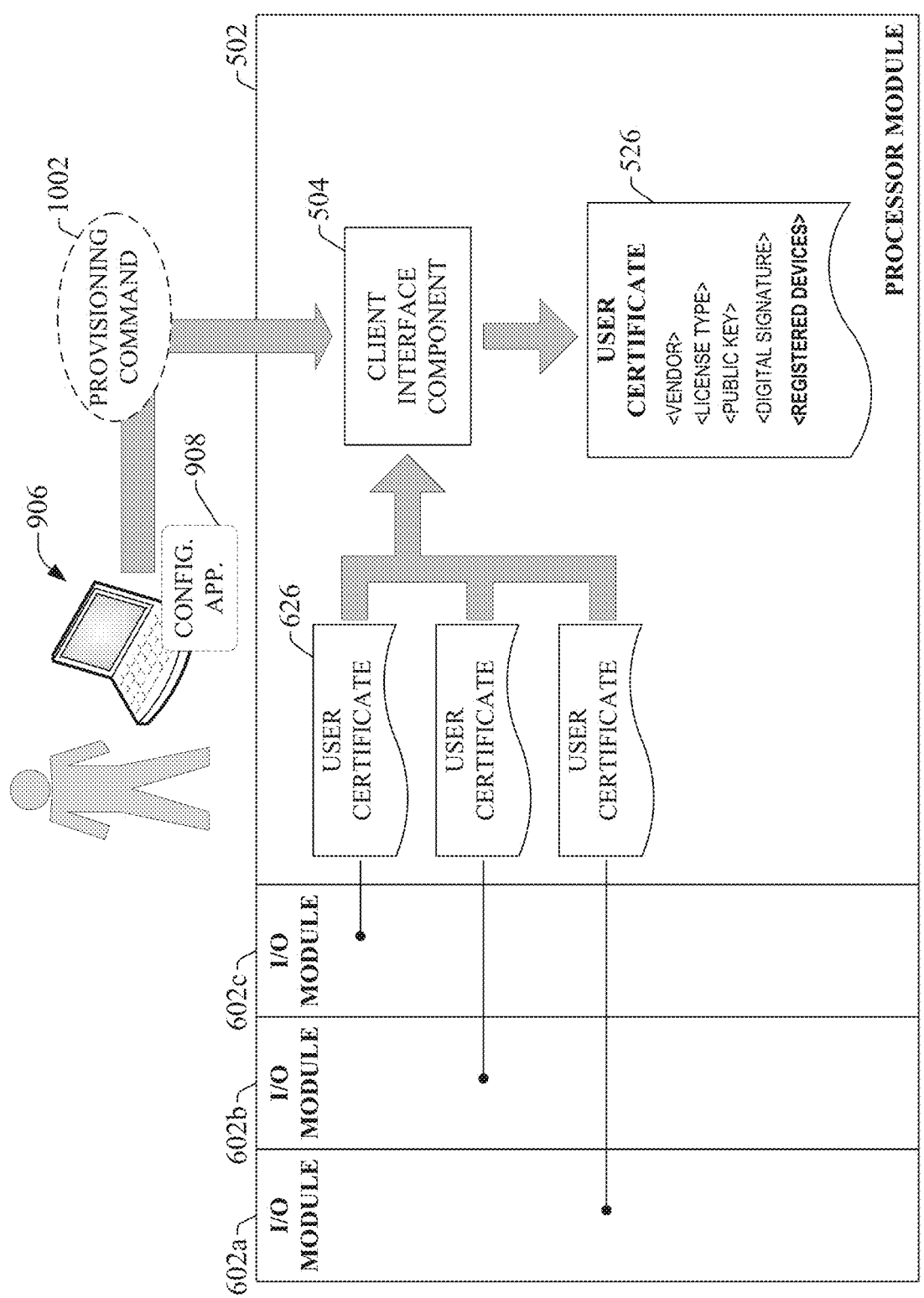
FIG. 10 is a diagram illustrating enrollment of installed modular devices for exclusive access to processor module over the backplane.

Some embodiments of processor module 502 can also be configured to generate user certificate data 526 during a provisioning or enrollment sequence that registers all modular devices currently installed on the controller's backplane. FIG. 10 is a diagram illustrating enrollment of installed modular devices 602 for exclusive access to processor module 502 over the backplane. In this example, the system designer has installed a processor module 502 and three modular devices 602a-602c (e.g., I/O modules or other types of modular devices) in the controller chassis, causing these devices to be interfaced with the controller's backplane. The modular devices 602a-602c are authorized devices that have been certified by the device vendor (or trusted third-party). The user has also issued user certificate date to the modular devices 602a-602c using the certificate authority functionality of configuration application 908.

If the user wishes to set the three modular devices 602a-602c to be the sole devices permitted to communicate with the processor module 502 via the backplane, the user can issue a provisioning command 1002 to the processor module 502 using client device 906. In this regard, the controller configuration application 908 executing on the client device 906 can include a provisioning or enrollment control that, when selected by the user, issues a provisioning command 1002 that causes processor module 502 to grant exclusive communication rights to all modular devices 602a-602c currently installed on the backplane. In response to receipt of the provisioning command 1002, client interface component 504 (or another logical component of processor module 502) reads the user certificate data 626 from each installed modular device 602a-602c and updates its own user certificate data 526 to reflect that only the devices corresponding to the obtained user certificates are to be granted communication privileges on the controller backplane. Subsequently, if a modular device that has not been previously registered in user certificate data 526 is installed on the controller backplane, even if this new modular device is a vendor-approved device, device authentication component 508 will determine that the new device is not one that has been authorized by the user for use on the controller backplane, and deny the new device access to the backplane. By supporting generation and management of user certificates in addition to vendor certificates, embodiments of the backplane security devices described herein can afford users a highly granular degree of backplane access control.

Figure 11:
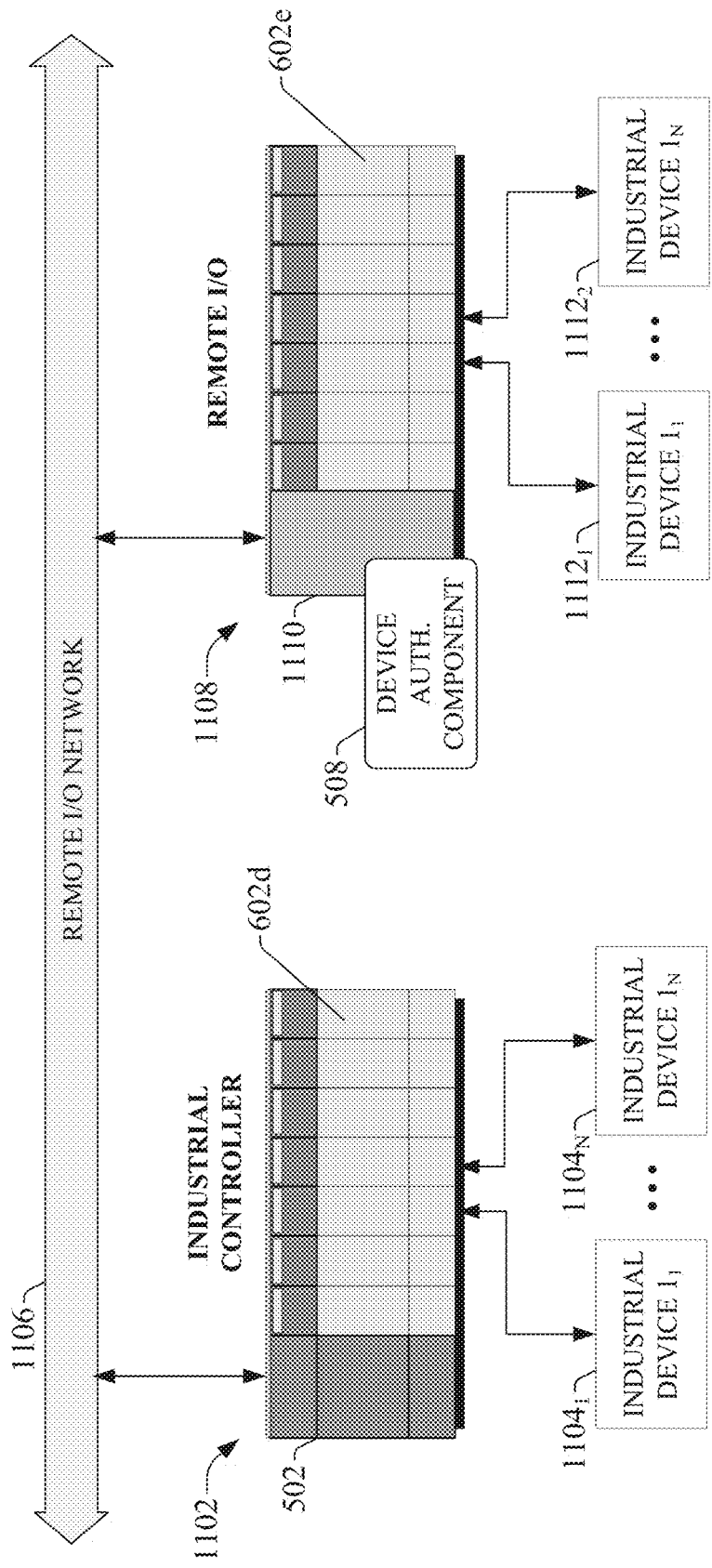
FIG. 11 is a diagram illustrating a remote I/O configuration that supports backplane-level security.

Although examples described above have considered embodiments in which the device authentication component 508 is implemented in the processor module 502 and used to authenticate modular devices on the primary controller backplane, the device authentication features described above can also be implemented in other types of supervisory modules, such as remote I/O adapter modules or networking modules. FIG. 11 is a diagram illustrating a remote I/O configuration that supports backplane-level security. In this example a primary industrial controller 1102 comprises a processor module 502 and one or more local modular devices 602d. Local I/O implemented on the local modular devices 602d is used to exchange control input and output data with industrial devices 1104 that are local to the industrial controller 1102. In addition, a remote I/O rack 1108 is located at another remote area of the plant relative to local industrial controller 1102. Remote I/O rack 1108 comprises a set of remote modular devices 602e and an adapter module 1110 that is networked to the processor module 502 via a remote I/O network 1106 (e.g., a common industrial protocol network, an Ethernet/IP network, or another open or proprietary network). Adapter module 1110 interfaces the remote modular devices 602e with the processor module 502, allowing the remote modular devices 602e to serve as remote expansion modules of industrial controller 1102 for control of remote industrial devices 1112.

In this example, adapter module 1110 is configured with a device authentication component 508, which authenticates each of the remote modular devices 602e installed in the remote I/O rack (e.g., using a similar authentication sequence as that described above in connection with FIG. 8, or using another suitable authentication sequence). Similar to processor module 502, adapter module 1110 can deny access to the remote rack's backplane—and thus to the processor module 502 via the remote I/O network—to any remote modular device 602e that has not been authenticated by the device vendor or trusted third-party, or that has not been registered as a user-authorized device.

Figure 12:
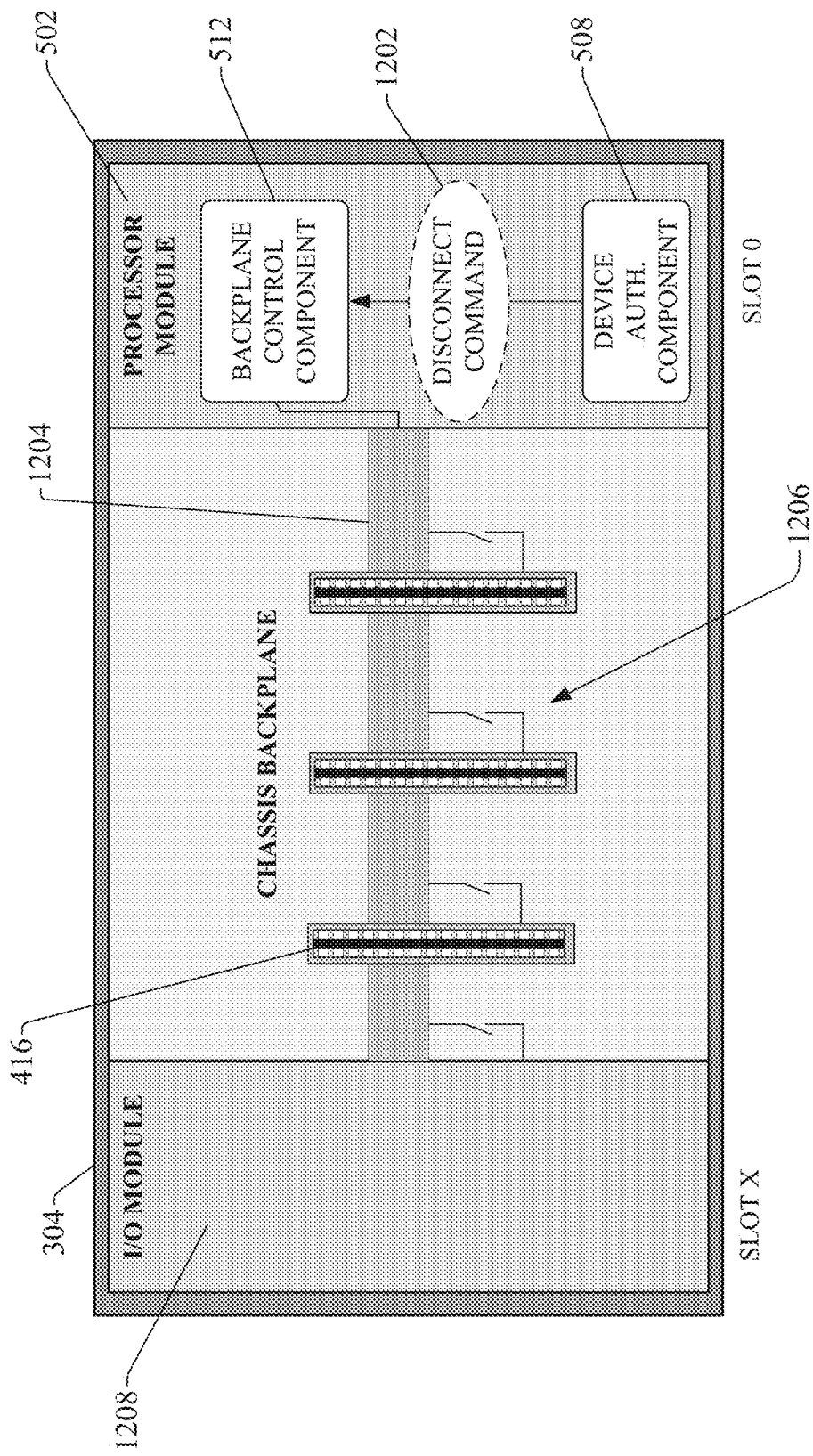
FIG. 12 is a diagram illustrating an embodiment of a processor module configured with a backplane control component capable of modifying operation of a controller backplane.

In response to detection of an unauthorized module on the backplane, the device authentication component 508 (whether implemented on a processor module 502, a remote I/O adapter module 1110, or another type of supervisory module) can execute a suitable countermeasure to protect the control system from the potentially rogue device. As a primary countermeasure, device authentication component 508 instructs the processor module 502 to disallow data communication to and from the unauthorized module via the backplane. In some embodiments, the processor module may also effect a modification to the backplane itself in order to protect the control system from the potentially rogue modular device. FIG. 12 is a diagram illustrating an embodiment of a processor module 502 configured with a backplane control component 512 capable of modifying operation of the backplane itself in order to protect the processor module 502, other I/O modules, and the controlled industrial equipment from rogue modular devices. In an example embodiment that supports backplane modification as a countermeasure against unauthorized modular devices, the controller backplane 1204 may be configured with controllable switches 1206 associated with each slot of the controller chassis 304, and which are capable of individually disconnecting each slot's interface port 416 from the backplane's power and/or data bus.

If device authentication component 508 determines that modular device 1208 is not an authorized device (using techniques described above), the device authentication component 508 instructs the processor module 502 to disallow communications to and from the modular device 1208. In addition, the device authentication component 508 can issue a disconnect command 1202 to the backplane control component 512 instructing the backplane control component 512 to isolate the modular device 1208 from the backplane 1204 by opening the switch 1206 associated with the interface port 416 to which the modular device 1208 is connected. In this way, the potentially rogue modular device 1208 can be deenergized by physically disconnecting the device 1208 from the backplane's power bus, and/or effectively quarantined by physically disconnecting the device 1208 from the backplane's data bus. To ensure that the correct interface port 412 is disconnected, the disconnect command 1202 can include the slot number corresponding to the modular device 1208 to be disconnected. In another example embodiment, rather than disconnecting individual interface ports 416, backplane control component 512 may be configured to disconnect power to the entire backplane 1204 in response to detection of an unauthorized module, thereby disabling all power and communication across the backplane. In yet another technique, the device authentication component 508 and backplane control component 512 can be implemented in the controller's power supply module rather than the processor module 502, and the power supply module can more directly isolate power from the backplane in response to detecting one or more unauthorized modules.

Figure 13:
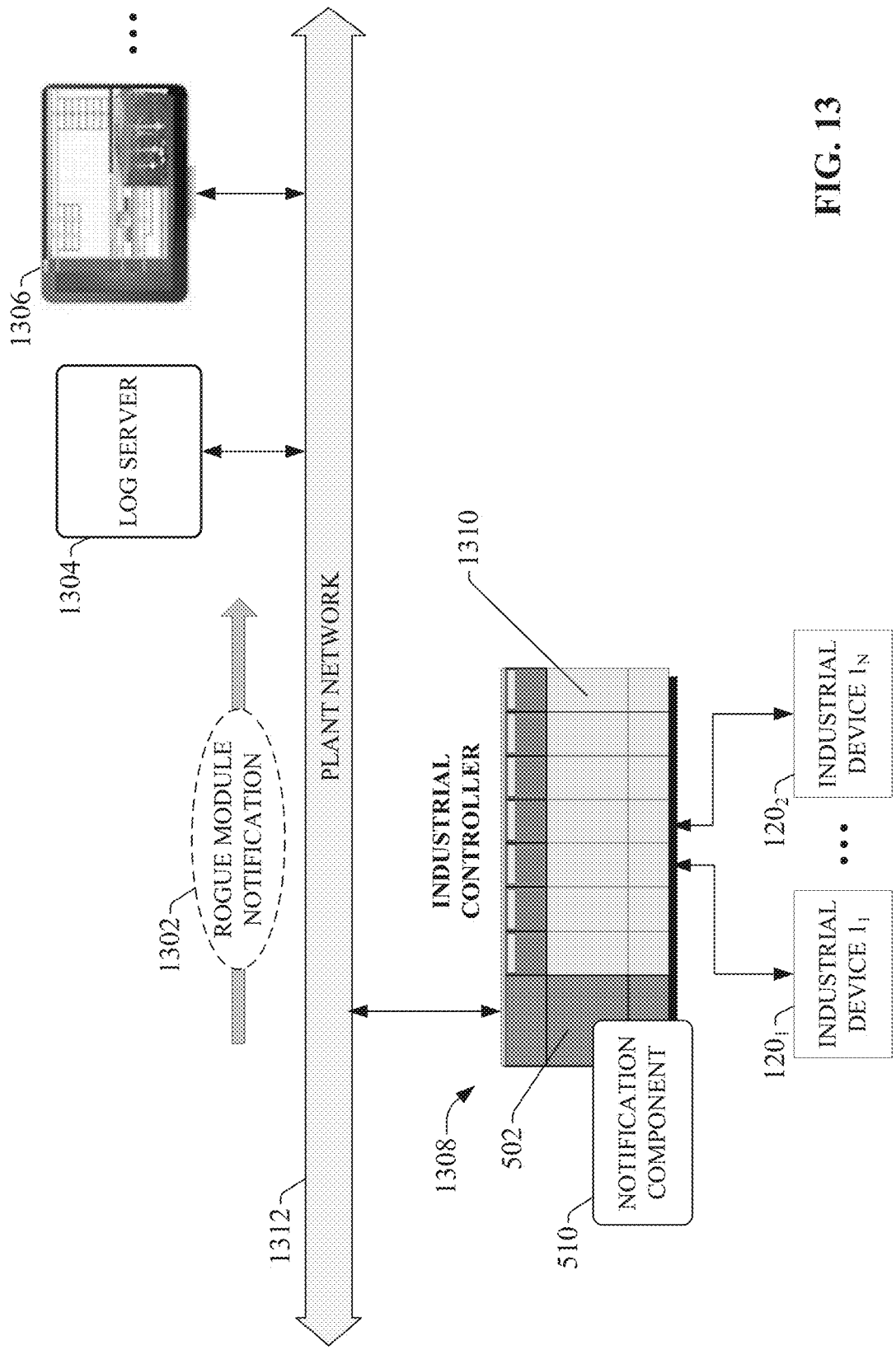
FIG. 13 is a diagram illustrating delivery of rogue module notifications.

Some embodiments can also be configured generate and deliver notifications in response to detection of an unauthorized module. FIG. 13 is a diagram illustrating delivery of rogue module notifications. In this example, an industrial controller 1308 comprising a processor module 502 that supports backplane authentication performs monitoring and control of industrial devices 120, via I/O modules 1310 installed on the controller's backplane. If the processor module's device authentication component 508 identifies an unauthorized I/O module 1310 (or other type of unauthorized modular device) installed on the backplane, the processor module's notification component 510 generates a rogue module notification 1302 and sends the notification to one or more defined target devices. The rogue module notification 1302 can include data that may assist the recipients in identifying the nature of the potential security breach, including but not limited to an identity of the industrial controller 1308, the identity of the slot in which the unauthorized module was detected, a type of the unauthorized device (e.g., analog input, digital output, etc.), a vendor and model number of the unauthorized device, an indication of whether the device is certified by the vendor (e.g., in the case in which the device is a vendor-approved device but has not been approved by the end user for operation on the industrial controller 1308), an indication of a countermeasure that was performed by the processor module 502 (e.g., disablement of the modular device, disconnection of power to the modular device or to the entire backplane, etc.), or other relevant information.

Target devices for the rogue module notification can be defined by the user (e.g., via the configuration application 908 used to configure and program the industrial controller). In an example configuration, processor module 502 may log the rogue module notification 1302 to a log server 1304 connected to the same plant network 1312 as the industrial controller 1308 (or to an office network accessible via the plant network 1312). The notification component 510 may also be configured to send the rogue module notification to an HMI terminal 1306, which renders the notification on an alarm screen for viewing by an operator or engineer. In yet another example, notification component 510 may be capable of delivering notifications 1302 as text messages to defined phone numbers or email addresses associated with appropriate plant personnel. Other types of notifications are also within the scope of one or more embodiments of this disclosure.

By providing industrial controller devices that support backplane-level security protocols, embodiments described herein address a long-standing and generally ignored security gap within the context of industrial automation environments. Recognizing the security vulnerability of the industrial controller's backplane, the systems and methods described herein can protect users' control systems from attacks by rogue controller modules installed on the controller backplane. Left unprotected, the backplane could provide a channel through which such rogue modules could collect sensitive proprietary information, tamper with control data, interfere with controlled industrial processes, or access other networks or data busses within the industrial facility. The industrial controller devices described herein can prevent such attacks using security components built into the devices at the time of manufacture, providing a high level of backplane protection without the need for user configuration. If more selective security is desired, configuration tools associated with the devices can allow a user to assign exclusive security rights to selected devices (e.g., devices known to have been purchased by the end user).

FIGS. 14A-15B illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 14A:
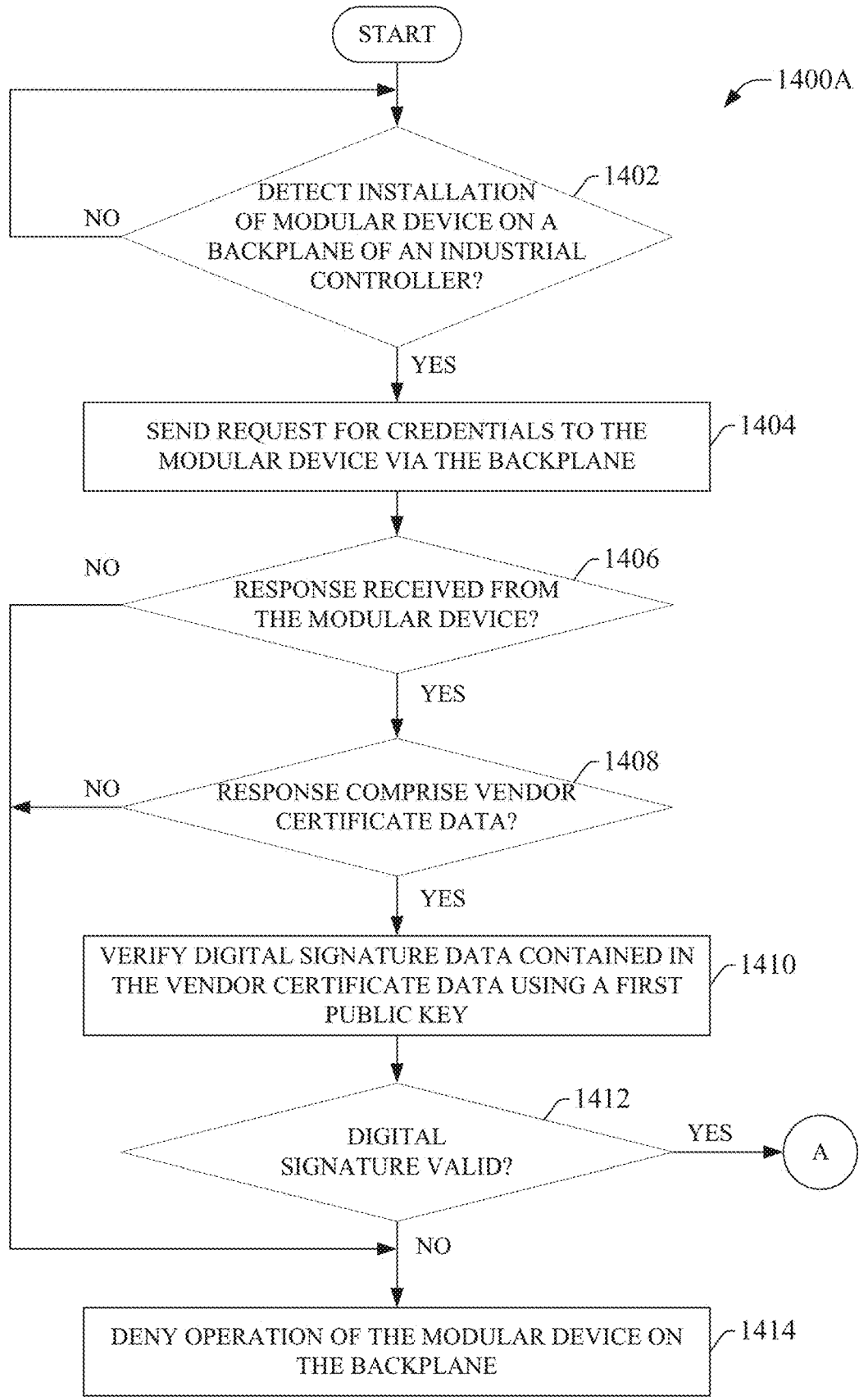
FIG. 14A is a flowchart of a first part of an example methodology for authenticating modular devices installed on an industrial controller's backplane.

FIG. 14A illustrates a first part of an example methodology 1400A for authenticating modular devices installed on an industrial controller's backplane. The example methodology can be implemented, for example, on a processor module configured to mount within an industrial controller chassis and execute a user-defined control program (e.g., a ladder logic program, a sequential function chart program, etc.) to facilitate monitoring and control of an industrial automation system or process. The example methodology can also be implemented in other types of industrial controller modules, including but not limited to remote I/O adapter modules, power supply modules, or networking modules.

Initially, at 1402, installation of a modular device on a backplane of an industrial controller is detected. The modular device may be, for example, a digital or analog input module, a digital or analog output module, a networking module, a special function module, or another type of module designed to exchange data with the processor module over the controller's backplane. The modular device may be detected, for example, based on receipt of a request from the modular device to be recognized by the processor module, a change in power or data flow across the backplane as a result of connecting the modular device to the backplane, or by another detection technique.

If installation of a modular device is detected (YES at step 1402), the methodology proceeds to step 1404, where a request for credentials is sent to the modular device via the backplane. At 1406, a determination is made as to whether a response is received from the modular device via the backplane in response to the request for credentials. If no response is received within a defined timeout period (NO at step 1406), the methodology proceeds to step 1414, where operation of the modular device on the backplane is denied. Alternatively, if a response is received (YES at step 1406), the methodology proceeds to step 1408, where a determination is made as to whether the response comprises vendor certificate data issued by a device vendor or other trusted third-party entity recognized by the processor module.

If the response does not comprise vendor certificate data (NO at step 1408), the methodology proceeds to step 1414 where operation of the modular device on the backplane is denied. Alternatively, if the response comprises vendor certificate data (YES at step 1408), the methodology proceeds to step 1410, where digital signature data contained in the vendor certificate data is verified using a first public key associated with a vendor (or a trusted third-party entity) and stored on the processor module.

At 1412, a determination is made as to whether the digital signature obtained at step 1410 is valid (that is, that the decrypted digital signature is recognized by the processor module, or matches a known and approved digital signature). If the digital signature is not valid (NO at step 1412), the methodology proceeds to step 1414, where operation of the modular device on the backplane is denied. Alternatively, if the digital signature is recognized (YES at step 1412), the methodology proceeds to step 1416 of the second part of the example methodology 1400B illustrated in FIG. 14B.

Figure 14B:
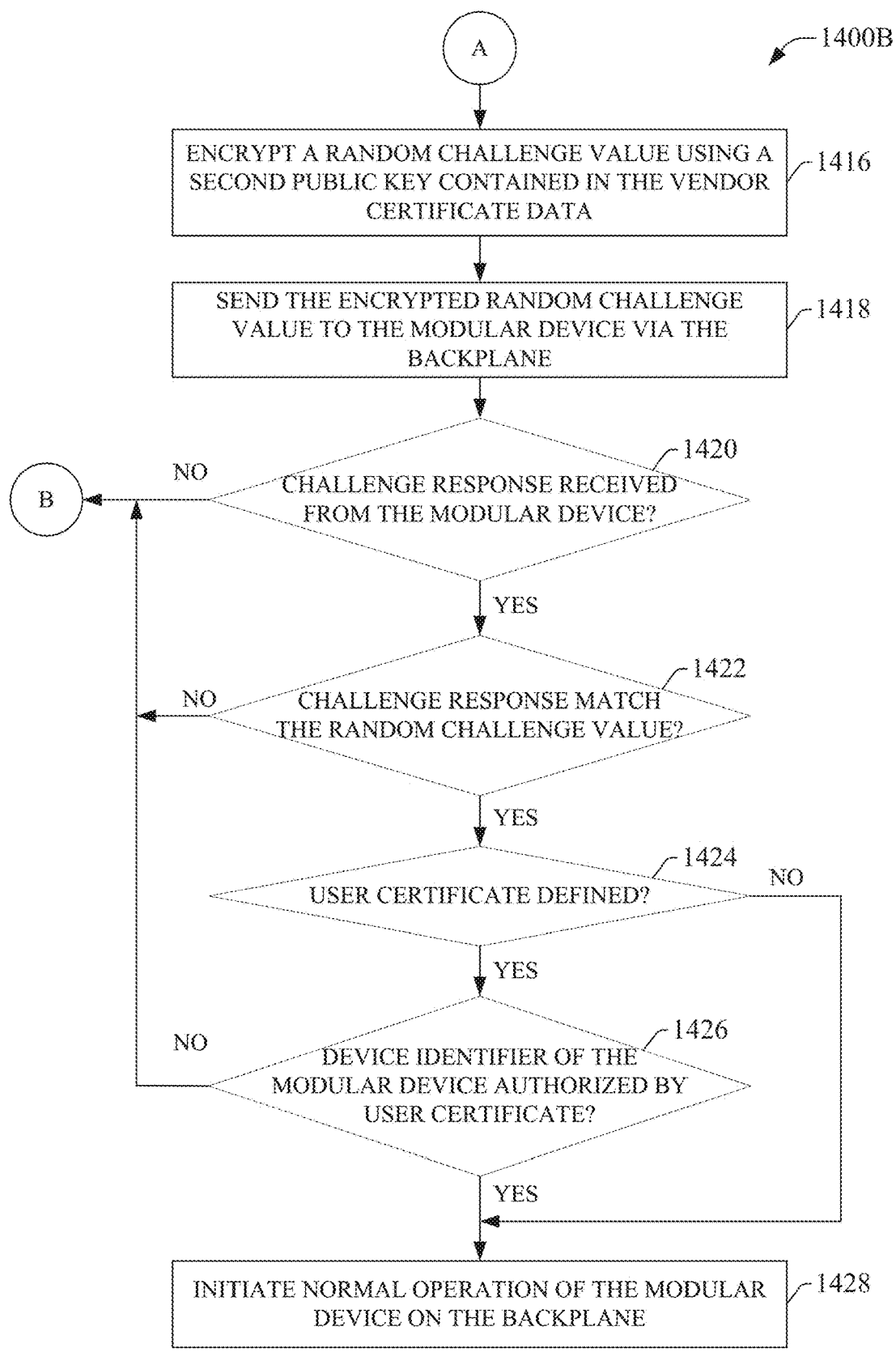
FIG. 14B is a flowchart of a second part of the example methodology for authenticating modular devices installed on an industrial controller's backplane.

FIG. 14B illustrates the second part of the example methodology 1400B. At 1416, a cryptographically random challenge value is encrypted using a second public key contained in the vendor certificate data received from the modular device at step 1408. The encrypted random challenge value represents a challenge issued to the modular device designed to prove the modular device's authenticity, since only a valid modular device that has been provided with a protected private key corresponding to the second public key will be able to properly decrypt the encrypted random challenge value. It is to be appreciated, however, that other types of authenticity challenges may be implemented at step 1416 in place of the encrypted random challenge value. At 1418, the encrypted random challenge value is sent to the modular device via the backplane.

At 1420, a determination is made as to whether a challenge response is received from the modular device via the backplane in response to sending the encrypted random challenge value at step 1418. If no challenge response is received at step 1420 within a defined timeout period (NO at step 1420), the methodology proceeds to step 1414, where the operation of the modular device on the backplane is denied. Alternatively, if the challenge response is received within the defined timeout period (YES at step 1420), the methodology proceeds to step 1422, where a determination is made as to whether the challenge response received at step 1420 matches the random challenge value that was encrypted at step 1416. In the regard, the challenge response should include the original random challenge value, obtained by the modular device by decrypting the encrypted random challenge value using the protected private key corresponding to the second public key. If the challenge response does not match the random challenge value (NO at step 1422), the methodology proceeds to step 1414, where operation of the modular device on the backplane is denied. Alternatively, if the challenge response matches the random challenge value (YES at step 1422), the methodology proceeds to step 1424, where a determination is made as to whether a user certificate has been defined on the controller module. The user certificate can be configured by the end user to define an exclusive set of device identifiers corresponding to devices that are to be granted exclusive operating privileges on the backplane.

If a user certificate is not defined (NO at step 1424), the methodology proceeds to step 1428, where normal operation of the modular device on the backplane is authorized and initiated. Alternatively, if a user certificate has been defined (YES at step 1424) the methodology proceeds to step 1426, where a determination is made as to whether the device identifier of the modular device (received at step 1406 as part of the modular device's first response) is authorized per the user certificate. The device identifier may be, for example, a physical device identifier such as a MAC address, or another protected identifier that is uniquely associated with the modular device. If the device identifier is not authorized (NO at step 1426), the methodology proceeds to step 1414, where operation of the modular device on the backplane is denied. Alternatively, if the device identifier is authorized (YES at step 1426), the methodology proceeds to step 1428, where normal operation of the modular device on the backplane is authorized and initiated.

Figure 15A:
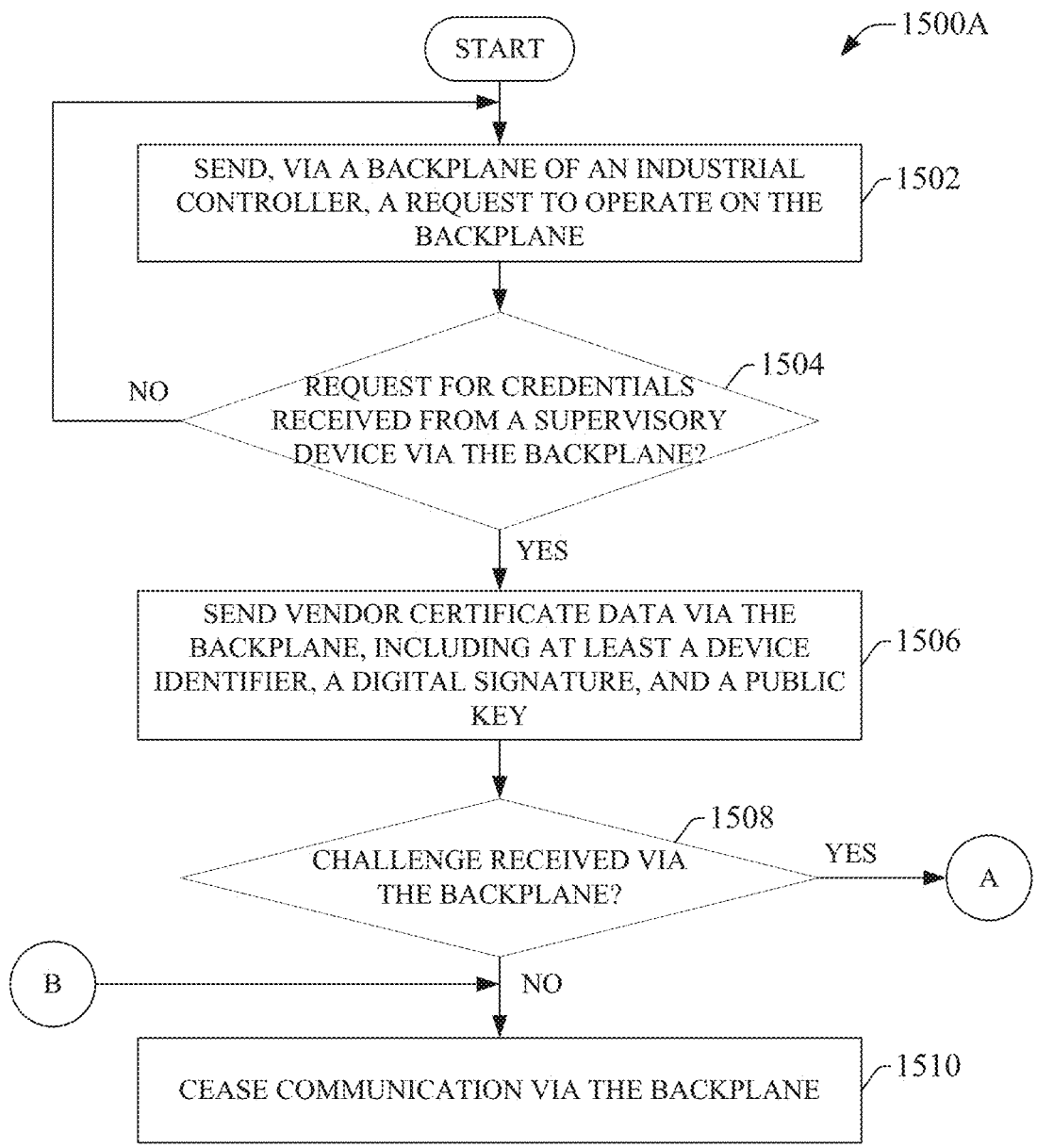
FIG. 15A is a flowchart of a first part of an example methodology for providing authentication credentials to a supervisory modular device via the backplane of an industrial controller.
Figure 15B:
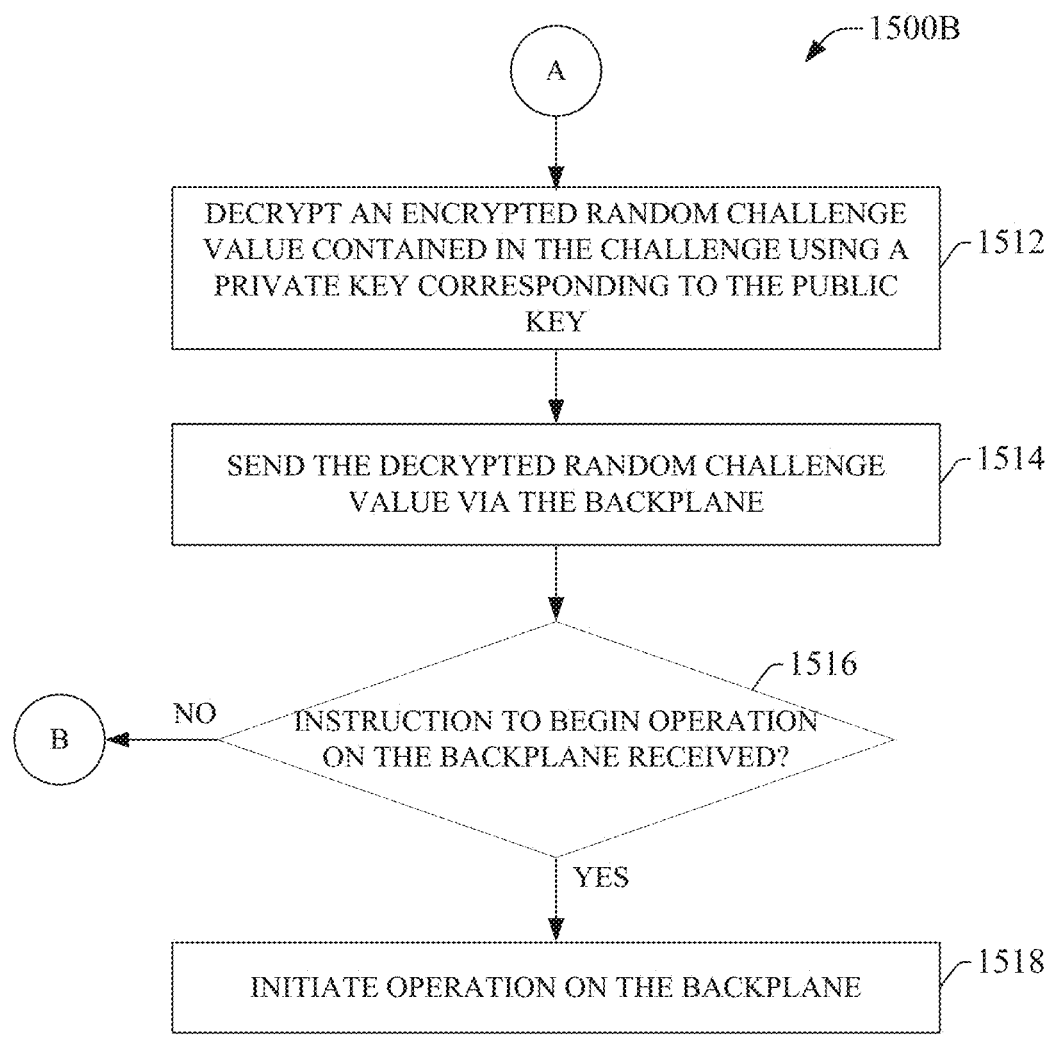
FIG. 15B is a flowchart of a second part of the example methodology for providing authentication credentials to a supervisory modular device via the backplane of an industrial controller.

FIG. 15A illustrates a first part of an example methodology 1500A for providing authentication credentials to a supervisory modular device—such as an industrial controller processor module, a power supply module, a remote I/O adaptor module, or a networking module—via the backplane of an industrial controller. The example methodology can be implemented on substantially any type of modular device designed to operate on the backplane of an industrial controller, including but not limited to a digital or analog input module, a digital or analog output module, a networking module, a special function module, or another type of controller module.

Initially, at 1502, a request to operate on the backplane of an industrial controller is sent via the backplane. The request can be sent by a modular device in response to detecting that the device has been connected to the power and/or data buses of the industrial controller's backplane. At 1504, a determination is made as to whether a request for credentials has been received from a supervisory device via the backplane. The supervisory device maybe, for example, the processor module of the industrial controller, a remote I/O adaptor module (in the case in which the modular device is installed in a remote I/O rack), a power supply module of the industrial controller, a networking module of the industrial controller, or another type of supervisory module.

If a request for credentials is received (YES at step 1504), the methodology proceeds to step 1506, where vendor certificate data—including at least a device identifier, a digital signature of an authorized vendor or trusted third-party entity, and a public key assigned to the modular device—is sent via the backplane. At 1508, a determination is made as to whether a challenge is received via the backplane. The challenge may be, for example, an encrypted random challenge value generated by the supervisory module using the public key provided by the modular device as part of the vendor certificate data at step 1506. However, other types of challenges designed to verify the authenticity of the modular device are within the scope of one or more embodiments of this disclosure. If no challenge is received within a defined timeout period (NO at step 1508), the methodology proceeds to step 1510, where the modular device ceases communication via the backplane. Alternatively, if the challenge is received within the defined timeout period (YES at step 1508), the methodology proceeds to step 1512 of the second part of the example methodology 1500B illustrated in FIG. 15B.

At 1512, an encrypted random challenge value contained in the challenge received at step 1508 is decrypted using a private key corresponding to the public key sent at step 1506. At 1514, the decrypted random challenge value obtained at step 1512 is sent via the backplane. At 1516, a determination is made as to whether an instruction to begin operation on the backplane is received via the backplane. The instruction may be issued by the supervisory module in response to confirming that the decrypted random challenge value sent at step 1514 matches the random challenge value originally generated by the supervisory module. If the instruction is not received within a defined timeout period (NO at step 1516), the methodology proceeds to step 1510, where the modular device ceases communication via the backplane. Alternatively, if the instruction is received (YES at step 1516), the methodology proceeds to step 1518, where the modular device initiates normal operation on the controller's backplane.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
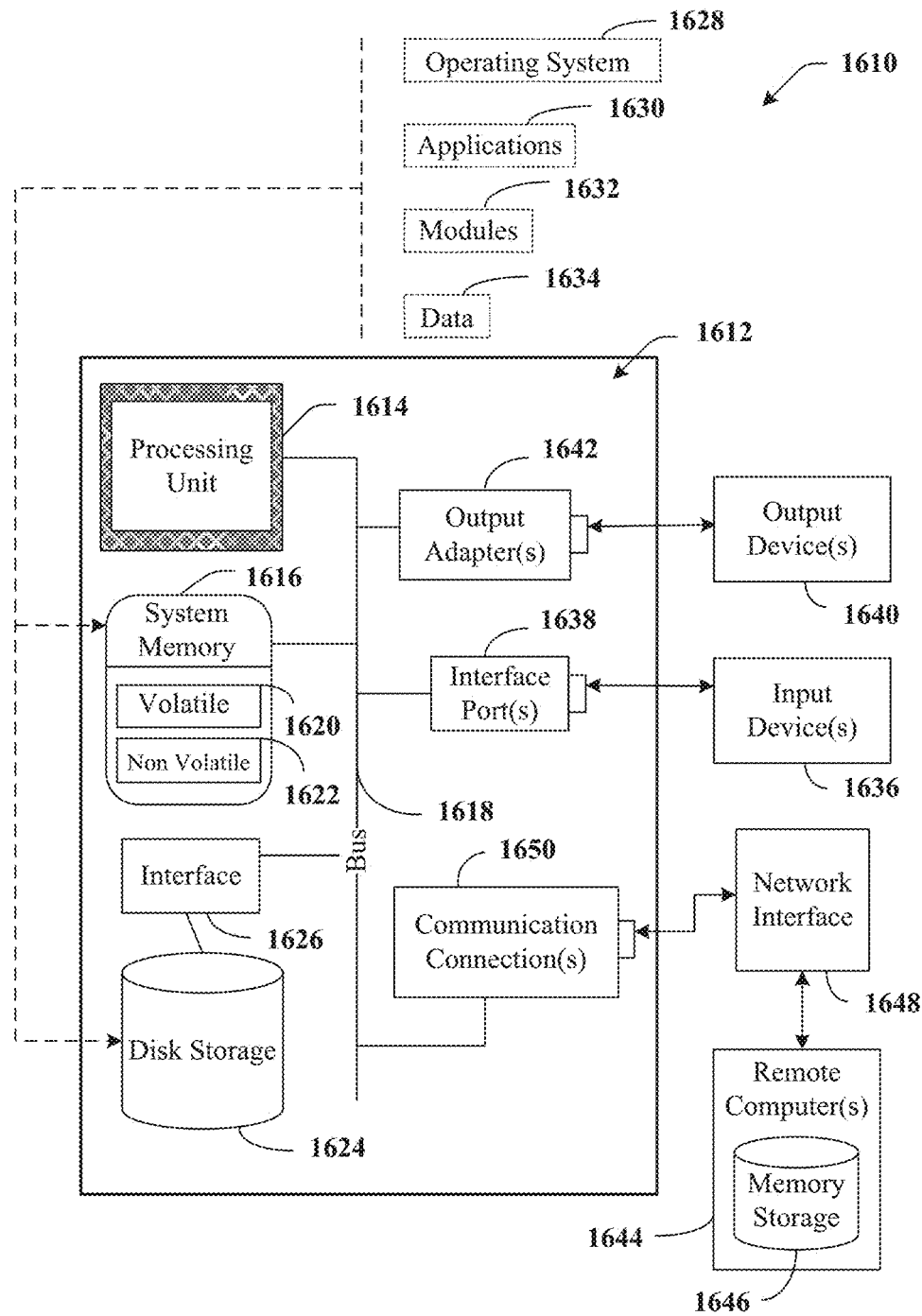
FIG. 16 is an example computing environment.
Figure 17:
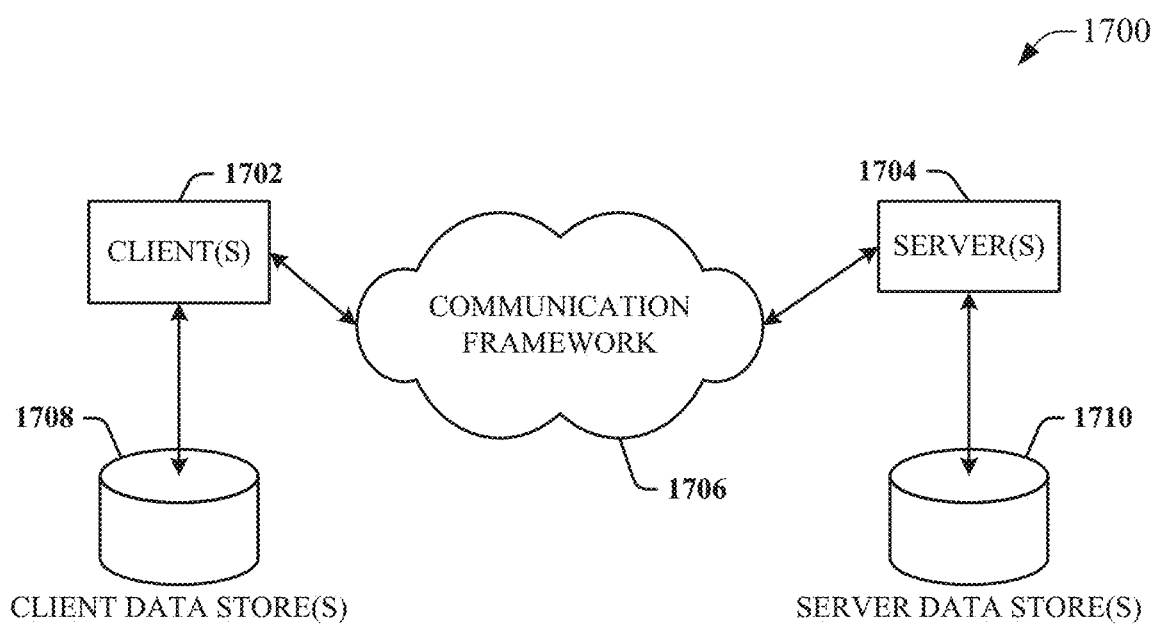
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multicore microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1648 can also encompass near field communication (NFC) or Bluetooth communication.

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial controller module, comprising:
memory that stores executable components; and
one or more processors, operatively coupled to the memory, that executes the executable components, the executable components comprising:
  a program execution component configured to execute an industrial control program that controls output signals of an industrial controller based on input signals received by the industrial controller, wherein the output signals and the input signals are conveyed via a backplane of the industrial controller, and the backplane comprises interface ports configured to interface the backplane with respective modular devices;
  a device authentication component configured to
    in response to detecting installation of a modular device on the backplane via an interface port of the interface ports, exchange authentication data with the modular device via the backplane as a device authentication sequence,
    in response to determining, based on a result of the device authentication sequence, that the modular device is authorized to operate on the backplane, initiate operation of the modular device on the backplane, and
    in response to determining, based on the result of the device authentication sequence, that the modular device is not authorized to operate on the backplane, instruct the industrial controller module to disallow communication to and from the modular device; and
  a backplane control component configured to, in response to determining, based on the result of the device authentication sequence, that the modular device is not authorized to operate on the backplane, issue a disconnect command that causes a switch associated with the interface port to isolate the modular device from the backplane.

2. The industrial controller module of claim 1, wherein the modular device is one of a digital input module, a digital output module, an analog input module, an analog output module, a networking module, a power supply module, or a special function module.

3. The industrial controller module of claim 1, wherein the disconnect command includes a slot number that identifies the switch and causes the switch corresponding to the slot number to disconnect the modular device from a power bus of the backplane.

4. The industrial controller module of claim 1, wherein the device authentication component is configured to send a request for certificate data to the modular device via the backplane, and disable the operation of the modular device on the backplane in response to determining that the certificate data is not received via the backplane within a defined duration of time after sending the request.

5. The industrial controller module of claim 4, wherein the device authentication component is further configured to, in response to receipt of the certificate data via the backplane, determine whether the certificate data is valid, and in response to determining that the certificate data is not valid, disable the operation of the modular device on the backplane.

6. The industrial controller module of claim 5, wherein the device authentication component is configured to verify digital signature data contained in the certificate data using public key data stored on the memory, and to determine whether the certificate data is valid based on verification of the digital signature data.

7. The industrial controller module of claim 4, wherein the device authentication component is further configured to, in response to determining that the certificate data is valid, send challenge data to the modular device via the backplane, and in response to receiving incorrect response data in response to the challenge data via the backplane, disable the operation of the modular device on the backplane.

8. The industrial controller module of claim 7, wherein the device authentication component is configured to send, as the challenge data, a cryptographically random challenge value encrypted using public key data contained in the certificate data, and to disable the operation of the modular device on the backplane in response to determining that the response data does not match the cryptographically random challenge value.

9. The industrial controller module of claim 5, wherein the certificate data is one of vendor certificate data or user certificate data.

10. The industrial controller module of claim 1, wherein the industrial controller module comprises at least one of a processor module, a power supply module, a remote I/O adaptor module, or a networking module.

11. A method for implementing industrial controller security, comprising:
in response to detecting installation of a modular device on an interface port of multiple interface ports of a backplane of an industrial controller, executing, by an industrial controller module comprising a processor, an authentication sequence that determines an authenticity of the modular device based on an exchange of authentication data via the backplane; and
in response to determining, based on a result of the authentication sequence, that the modular device is an authorized device, initiating operation of the modular device on the backplane; or
in response to determining, based on the result of the authentication sequence, that the modular device is not an authorized device, disabling operation of the modular device on the backplane, wherein the disabling comprises issuing a disconnect command that causes a switch associated with the interface port to isolate the modular device from the backplane.

12. The method of claim 11, wherein the disconnect command causes the switch to open, and opening of the switch isolates the modular device from a power bus of the backplane.

13. The method of claim 11, wherein
the executing the authentication sequence comprises sending a request for certificate data via the backplane to the modular device; and
the disabling the operation of the modular device comprises:
disabling the operation in response to determining that the certificate data is received via the backplane is not valid, or
disabling the operation in response to determining that the certificate data is not received via the backplane within a defined duration of time after the sending the request.

14. The method of claim 13, further comprising:
verifying, by the industrial controller module, digital signature data contained in the certificate data using public key data stored on a memory of the industrial controller module,
wherein the disabling the operation of the modular device comprises disabling the operation in response to determining, based on a result of the verifying that the digital signature is not valid.

15. The method of claim 13, further comprising:
in response to determining that the certificate data is valid, sending, by the industrial controller module, challenge data to the modular device via the backplane,
wherein the disabling the operation of the modular device comprises disabling the operation in response to receiving incorrect challenge response data from the modular device via the backplane in response to sending the challenge data.

16. The method of claim 15, wherein the sending the challenge data comprises:
encrypting a cryptographically random challenge value using public key data contained in the certificate data to yield an encrypted challenge value; and
sending the encrypted challenge value to the modular device via the backplane,
wherein the disabling the operation of the modular device comprises disabling the operation in response to determining that the challenge response data does not match the cryptographically random challenge value.

17. The method of claim 14, wherein the certificate data comprises vendor certificate data or user certificate data.

18. A non-transitory computer-readable medium having stored thereon executable instructions that, in response to execution, cause an industrial controller module comprising at least one processor to perform operations, the operations comprising:
detecting installation of a modular device on an interface port of multiple interface ports of a backplane of an industrial controller;
in response to the detecting, sending a request for security credential data to the modular device via the backplane;
in response to receiving the security credential data via the backplane, determining whether the security credential data is authentic;
in response to determining that the security credential data is authentic, generating challenge data based on information contained in the security credential data;
sending the security challenge data to the modular device via the backplane; and
in response to determining that the security credential data is not authentic or that a response to the security challenge data received from the modular device via the backplane is not correct, disabling operation of the modular device on the backplane, wherein the disabling comprises generating a disconnect command instructs a switch associated with the interface port to electrically disconnect the modular device from the backplane.

19. The non-transitory computer-readable medium of claim 18, wherein the security credential data is at least one of vendor certificate data or user certificate data.

20. The industrial controller module of claim 1, the executable components further comprising a client interface component configured to, in response to receipt of a provisioning command, register user certificate data read from one or more modular devices installed on the backplane, wherein registration of the user certificate data causes the device authentication component to permit only the one or more modular devices to operate on the backplane.

\* \* \* \* \*